(12) United States Patent
Ohara et al.

(10) Patent No.: US 8,215,665 B2
(45) Date of Patent: Jul. 10, 2012

(54) AIRBAG DEVICE

(75) Inventors: Koji Ohara, Toyota (JP); Takashi Sasaki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/195,538

(22) Filed: Aug. 1, 2011

(65) Prior Publication Data

US 2011/0285114 A1    Nov. 24, 2011

Related U.S. Application Data

(63) Continuation of application No. PCT/JP2009/063270, filed on Jul. 24, 2009.

(51) Int. Cl.
  *B60R 21/206* (2011.01)
  *B60R 21/233* (2006.01)
  *B60R 21/2334* (2011.01)
(52) U.S. Cl. ............ 280/729; 280/730.1; 280/732; 280/740; 280/743.2
(58) Field of Classification Search ........... 280/729, 280/730.1, 732, 736, 740, 742, 743.1, 743.2
  See application file for complete search history.

(56) References Cited

U.S. PATENT DOCUMENTS

| | | | | |
|---|---|---|---|---|
| 3,642,303 A | * | 2/1972 | Irish et al. ............ | 280/730.1 |
| 3,767,225 A | * | 10/1973 | Mazelsky ............ | 280/729 |
| 3,768,830 A | * | 10/1973 | Hass ............ | 280/729 |
| 3,788,665 A | * | 1/1974 | Noll et al. ............ | 280/729 |
| 4,043,572 A | | 8/1977 | Hattori et al. | |
| 4,076,277 A | * | 2/1978 | Kuwakado et al. ............ | 280/738 |
| 4,265,468 A | * | 5/1981 | Suszko et al. ............ | 280/729 |
| 4,290,627 A | * | 9/1981 | Cumming et al. ............ | 280/729 |
| 5,513,877 A | * | 5/1996 | MacBrien et al. ............ | 280/732 |
| 5,577,765 A | * | 11/1996 | Takeda et al. ............ | 280/729 |

(Continued)

FOREIGN PATENT DOCUMENTS

JP    B-50-39891    12/1975

(Continued)

OTHER PUBLICATIONS

International Search Report dated Aug. 25, 2009 in International Application No. PCT/JP2009/063270 (with translation).

*Primary Examiner* — Paul N Dickson
*Assistant Examiner* — Laura Freedman
(74) *Attorney, Agent, or Firm* — Oliff & Berridge, PLC

(57) ABSTRACT

The present invention obtains an airbag device that can effectively protect an upper body and knees of a passenger by a simple airbag structure. An airbag that structures an airbag device for a passenger's seat has a main bag that restrains an upper body of a vehicle passenger from a front side in a vehicle longitudinal direction, a sub-bag that has a smaller volume than the main bag and that restrains knees of the passenger from the front side in the vehicle longitudinal direction, and an inner tube that is folded-up together with the main bag and the sub-bag and is inflated and expanded within the airbag by a gas supply from an inflator. The inner tube directly supplies gas of the inflator to the main bag and the sub-bag respectively. A check valve is provided at a gas exit that communicates the inner tube with the sub-bag.

13 Claims, 21 Drawing Sheets

U.S. PATENT DOCUMENTS

| | | | |
|---|---|---|---|
| 5,775,729 A * | 7/1998 | Schneider et al. | 280/730.1 |
| 6,139,048 A | 10/2000 | Braunschadel | |
| 6,431,586 B1 * | 8/2002 | Eyrainer et al. | 280/730.1 |
| 7,195,279 B2 * | 3/2007 | Rose et al. | 280/740 |
| 7,540,531 B2 * | 6/2009 | Sakakibara et al. | 280/732 |
| 7,631,891 B2 | 12/2009 | Washino | |
| 7,695,012 B2 * | 4/2010 | Libby et al. | 280/743.1 |
| 2005/0040634 A1 | 2/2005 | Braun et al. | |
| 2008/0048420 A1 | 2/2008 | Washino | |
| 2008/0054602 A1 * | 3/2008 | Yang | 280/729 |

FOREIGN PATENT DOCUMENTS

| | | |
|---|---|---|
| JP | A-51-5728 | 1/1976 |
| JP | A-51-23917 | 2/1976 |
| JP | U-7-17662 | 3/1995 |
| JP | A-11-115667 | 4/1999 |
| JP | A-11-222097 | 8/1999 |
| JP | A-2002-254999 | 9/2002 |
| JP | A-2004-262432 | 9/2004 |
| JP | A-2007-106376 | 4/2007 |
| JP | A-2008-49858 | 3/2008 |

* cited by examiner

AIRBAG DEVICE

TECHNICAL FIELD

The present invention relates to an airbag device having a first airbag for restraining an upper body of a passenger and a second airbag for restraining knees of the passenger.

BACKGROUND TECHNOLOGY

Airbag devices in which an airbag for restraining knees of a passenger is provided so as to be connected with an airbag for restraining an upper body of the passenger are known (see, for example, Japanese Utility Model Application Laid-Open No. 7-17662 and Japanese Patent Application Laid-Open (JP-A) No. 51-5728). Further, there are known airbag devices that simultaneously inflate and expand, by a gas supply from a common pressure accumulator, an airbag for restraining an upper body of a passenger and an airbag for restraining knees of the passenger (see, for example, JP-A No. 51-23917). In the latter device, a check valve is provided respectively between the pressure accumulator and each airbag, and the internal pressure of each airbag is held at a predetermined value. Moreover, a technique is known of controlling the internal pressure of an airbag by the opening/closing of a vent hole (see, for example, JP-A No. 2004-262432 and JP-A No. 11-222097). Still further, there is known a technique in which a tube-shaped frame forming portion is provided along the inner surface of an airbag, and the airbag is inflated and expanded on the whole due to gas being supplied to the frame forming portion (see, for example, JP-A No. 2007-106376).

DISCLOSURE OF THE INVENTION

Problems to be Solved by the Invention

However, with regard to airbag devices, there is room for improvement in order to effectively protect the upper body and the knees of the passenger by a simple airbag structure.

An object of the present invention is to obtain an airbag device that can effectively protect the upper body and the knees of the passenger by a simple airbag structure.

Means for solving the Problems

An airbag device relating to a first aspect of the present invention has: a first airbag that, by receiving a gas supply and inflating and expanding from a folded-up state, restrains an upper body of a vehicle passenger from a front side in a vehicle longitudinal direction; a second airbag that has a smaller volume than the first airbag and that, by receiving a gas supply and inflating and expanding from a folded-up state, restrains knees of the passenger from the front side in the vehicle longitudinal direction; a gas flow path member that is flexible, that is folded-up together with the first airbag and the second airbag, and that, by a gas supply from an inflator, is inflated and expanded at interiors of the first airbag and the second airbag and directly leads gas from the inflator to the first airbag and the second airbag respectively; a gas discharge suppressing structure that suppresses discharging, from the second airbag, of gas supplied to the second airbag; and a cloth-like material that demarcates an internal space of the first airbag and an internal space of the second airbag, and limits an expanded thickness of the second airbag in the vehicle longitudinal direction, the gas flow path member passing through the cloth-like material and the gas flow path member being opened at the second airbag interior.

In accordance with the above-described aspect, when the inflator is operated at the time of a front collision of the vehicle for example, the gas flow path member is inflated and expanded by gas from the inflator. Then, the gas from the inflator is supplied via the gas flow path member to the first bag and the second bag respectively. Due to this gas supply, the first bag and the second bag are respectively inflated and expanded. The first airbag restrains the upper body of the passenger, and the second airbag restrains the knees of the passenger.

Here, in the present airbag device, due to the gas flow path member, that is folded-up together with the first airbag and the second airbag, being inflated and expanded, the gas from the inflator is supplied directly from the gas flow path member to the first airbag and the second airbag, respectively. Namely, gas can be supplied directly (independently) to the first airbag and the second airbag, respectively, by a simple airbag structure. Therefore, in the present airbag device, the second airbag whose volume is relatively small is expanded first, and, for example, the knees that are easily placed near a vehicle cabin member at the vehicle front can be protected effectively. Further, in the present airbag device, because the gas discharge suppressing structure is provided, gas being discharged from the second airbag accompanying, for example, the restraining of the knees by the second airbag is suppressed or prevented. Due thereto, in the process of restraining the knees of the passenger, the internal pressure of the second airbag is maintained (i.e., an effective restraining state is maintained), and the knees can be effectively protected. On the other hand, the upper body, at which the space in front is wide as compared with the knees, is protected effectively by the first airbag that has a relatively large volume.

In this way, in the airbag device of the above-described aspect, the upper body and the knees of the passenger can be protected effectively by a simple airbag structure.

Further, in the present airbag device, the gas flow path member is inflated and expanded at the first airbag and the second airbag interiors. Namely, in the present airbag device, because the gas flow path member bears a portion of the volume of the first airbag and the second airbag, it is expanded as an overall airbag that includes the first airbag and the second airbag, in a short time (by a small amount of gas).

Further, in the present airbag device, the expanded thickness of the second airbag in the vehicle longitudinal direction is limited by the cloth-like material, and the second airbag is expanded well in the narrow gap between the knees of the passenger and the vehicle body. Because the gas flow path member passes through the cloth-like material, gas is supplied to the second airbag from the distal end side thereof, and the second airbag is expanded well from this distal end side.

In the above-described aspect, the gas discharge suppressing structure may be a structure that includes a check valve that is provided at the gas flow path member or a communicating portion of the gas flow path member and the second airbag, and that prevents gas flow from the second airbag to the gas flow path member when internal pressure of the second airbag becomes higher than internal pressure of the gas flow path member.

In accordance with the above-described aspect, when the internal pressure of the second airbag rises more than the internal pressure of the gas flow path member, the check valve closes, and gas flow from the second airbag toward the gas flow path member side is prevented (cut-off or suppressed). By such a simple structure, gas being discharged from the second airbag accompanying the restraining of the knees by the second airbag is prevented or suppressed.

In the above-described aspect, the gas discharge suppressing structure may be a structure that includes a flow path closing structure that is provided at the gas flow path member or a communicating portion of the gas flow path member and the second airbag, and that, accompanying inflation and expansion of at least one of the first airbag and the second airbag, closes a flow path that communicates the gas flow path member with the second airbag.

In accordance with the above-described aspect, the flow path closing structure closes the gas flow path from the gas flow path member to the second airbag, accompanying the inflation and expansion of at least one of the first airbag and the second airbag. By such a simple structure, gas being discharged from the second airbag accompanying the restraining of the knees by the second airbag is prevented or suppressed.

In this way, in the airbag device of the above-described aspect, the upper body and the knees of the passenger can be effectively protected by a simple airbag structure.

In the above-described aspect, the flow path closing structure may be a structure that is structured such that a cord-like member or a pair of cord-like members, that is connected to a mounting portion to a vehicle body at a front side in the vehicle longitudinal direction at the first airbag or the second airbag and to a portion that is expanded toward a rear side in the vehicle longitudinal direction with respect to the mounting portion at the first airbag or the second airbag, are wound around a portion that leads gas to the second airbag at the gas flow path member.

In accordance with the above-described aspect, accompanying the inflation and expansion of at least one of the first airbag and the second airbag, the cord-like member or the pair of cord-like members are expanded (extended) in the vehicle longitudinal direction, and the cord-like member is wound on the gas flow path member, and the gas flow path member is throttled. Due thereto, the flow path closing structure is structured by a simple structure.

The above-described aspect may be a structure that further has a communication delaying structure that is provided at the gas flow path member or a communicating portion of the gas flow path member and the first airbag, and that, when internal pressure of the gas flow path member exceeds a predetermined value, changes a state between the inflator and the first airbag to a communicating state from a non-communicating state.

In accordance with the above-described aspect, in the initial stage of operation of the inflator, the portion between the inflator and the first airbag at the gas flow path member, or the portion that should communicate with the first airbag at the gas flow path member, is in a non-communicating state by the communication delaying structure. Therefore, in the initial stage of operation of the inflator, the gas from the inflator is selectively supplied to the second airbag, and the second airbag is inflated and expanded in a short time. Due thereto, the knees of the passenger are protected even more effectively.

On the other hand, when the second airbag is inflated and expanded and the internal pressure of the gas flow path member exceeds a predetermined value, the portion between the inflator and the first airbag at the gas flow path member, or the portion that should communicate with the first airbag at the gas flow path member, is set in a communicating state by the communication delaying structure. Due thereto, due to gas being supplied through the gas flow path member to the first airbag, the first airbag is inflated and expanded, and the upper body of the passenger is restrained by the first airbag.

In the above-described aspect, the gas flow path member may be a structure that is inflated and expanded along a vehicle vertical direction, and is communicated with the first airbag at an upper end side in the vehicle vertical direction, and is communicated with the second airbag at a lower end side in the vehicle vertical direction.

In accordance with the above-described aspect, the gas flow path member is inflated and expanded at the first airbag and second airbag interiors along the vehicle vertical direction, and gas is supplied to the first airbag from the vehicle upper end side of the gas flow path member, and gas is supplied to the second airbag from the vehicle lower end side. Due thereto, for example, in a structure in which the present airbag device is disposed in a vicinity of the vehicle rear end of the instrument panel, the first airbag and the second airbag can be expanded well by the gas supply from a common inflator.

In the above-described aspect, the gas flow path member may be a structure that extends toward a rear side in the vehicle longitudinal direction and toward an upper side in a vehicle vertical direction, and is expanded so as to be folded-back toward a front side in the vehicle longitudinal direction and a lower side in the vehicle vertical direction, and is communicated with the first airbag at a folded-back portion, and is communicated with the second airbag at a folded-back end side.

In accordance with the above-described aspect, mainly the portion in front of the fold-back of the gas flow path member is inflated and expanded at the first airbag interior, and the folded-back end side toward the vehicle front and lower side is inflated and expanded at the second airbag interior. Further, in the present aspect, gas is supplied from the folded-back portion of the gas flow path member to the first airbag, and gas is supplied from the folded-back end side to the second airbag. Due thereto, for example, in a structure in which the present airbag device is disposed at the rear portion of the instrument panel so as to face both the top and rear of the vehicle, the first airbag and the second airbag can be expanded well by the gas supply from a common inflator.

The above-described aspect may be a structure in which the second airbag interior is demarcated by a partitioning cloth into two chambers in the vehicle vertical direction, and a plurality of communication paths that communicate the two chambers are formed at the partitioning cloth.

In accordance with the above-described aspect, the expanded shape (the expanded thickness in the vehicle longitudinal direction, the expanded width in the vehicle transverse direction, and the like) of the second airbag is limited by the partitioning cloth as well. Because plural communication holes are formed at the partitioning cloth, the structure is simple as compared with a structure in which the gas flow path member is open at both sides with respect to the partitioning cloth at the second airbag interior.

In the above-described aspect, the gas flow path member may be a structure that passes through the cloth-like material and the partitioning cloth respectively, and is opened within a chamber at a lower side in the vehicle vertical direction at the second airbag interior.

In accordance with the above-described aspect, because the gas flow path member passes through the partitioning cloth and opens at the chamber at the distal end side of the second airbag, gas is supplied to the second airbag from the distal end side thereof, and the second airbag is inflated and expanded from this distal end side.

In the above-described aspect, the gas flow path member may be a structure that passes through the cloth-like material, and is opened within a chamber at an upper side in the vehicle vertical direction at the second airbag interior.

In accordance with the above-described aspect, because the gas flow path member supplies gas between the cloth-like material and the partitioning cloth, the second airbag is inflated and expanded from the upper portion in the vehicle vertical direction.

The above-described aspect may be a structure in which at least a portion, that leads gas to the first airbag at the gas flow path member, is structured so as to supply gas toward both sides in a vehicle transverse direction at the first airbag interior.

In accordance with the above-described aspect, the first airbag is inflated and expanded by gas that is supplied from the gas flow path member toward the vehicle transverse direction both sides. Therefore, the first airbag inflating and expanding toward the rear of the vehicle is suppressed.

The above-described aspect may be a structure in which the first airbag, the second airbag and the gas flow path member are disposed in a folded-up state within an instrument panel of a vehicle, and the airbag device further has: an in-bag expanding portion that is communicated with the gas flow path member, and that is inflated and expanded by a gas supply from the gas flow path member such that an upper end side in the vehicle vertical direction faces a windshield glass from a rear side in the vehicle longitudinal direction and a lower end side in the vehicle vertical direction faces the instrument panel from a rear side in the vehicle longitudinal direction; and a gas discharge suppressing structure for the in-bag expanding portion that suppresses discharging, from the in-bag expanding portion, of gas supplied to the in-bag expanding portion, wherein reaction force at a time of restraining the upper body of the passenger by the first airbag is supported by the windshield glass and the instrument panel via the in-bag expanding portion.

In accordance with the above-described aspect, the in-bag expanding portion, to which gas is supplied from the gas flow path member, is inflated and expanded in the vehicle vertical direction, and, at the upper end side, faces the back surface side of the windshield glass, and, at the lower end side, faces the back surface side of the instrument panel. When the upper body of the passenger is restrained by the first airbag, the reaction force that accompanies this restraining is supported by the windshield glass and the instrument panel via the in-bag expanding portion. Here, in the present airbag device, because the gas discharge suppressing structure is provided, when the upper body of the passenger is restrained by the first airbag, discharging of gas from the in-bag expanding portion is prevented or suppressed. Therefore, in the present airbag device, the burden of supporting the reaction force toward the windshield glass and the instrument panel by the first airbag itself is lessened, and the first airbag can be made to be compact.

In the above-described aspect, the in-bag expanding portion may be a structure that is shaped such that an interval between both edges in a vehicle transverse direction gradually widens from a lower side toward an upper side in the vehicle vertical direction.

In accordance with the above-described aspect, because both edges of the in-bag expanding portion in the vehicle transverse direction form a substantial "V" shape in front view, the reaction force, that accompanies the restraining of the upper body of the passenger by the first airbag, is supported in a form that is near three-point support. Therefore, the state (expanded posture) of the restraining of the upper body of the passenger by the first airbag is stable.

Effect of the Invention

As described above, the airbag device relating to the present invention has the excellent effect that the upper body and the knees of a passenger can be effectively protected by a simple airbag structure.

BEST FORMS FOR EMBODYING THE INVENTION

An airbag device 10 for a passenger's seat, that serves as an airbag device relating to a first embodiment of the present invention, is described on the basis of FIG. 1 to FIG. 4. Note that arrow FR, arrow UP, arrow W that are written appropriately in the respective drawings respectively indicate the vehicle front direction (traveling direction), the upward direction, and the vehicle transverse direction of a vehicle V, a passenger's seat 12 to which the airbag device 10 for a passenger's seat is applied. Further, when describing the shape and the like of an airbag 20 (structural portions thereof) in the following description, the shape and the like in the inflated and expanded state are meant unless particularly noted.

Figure 1:
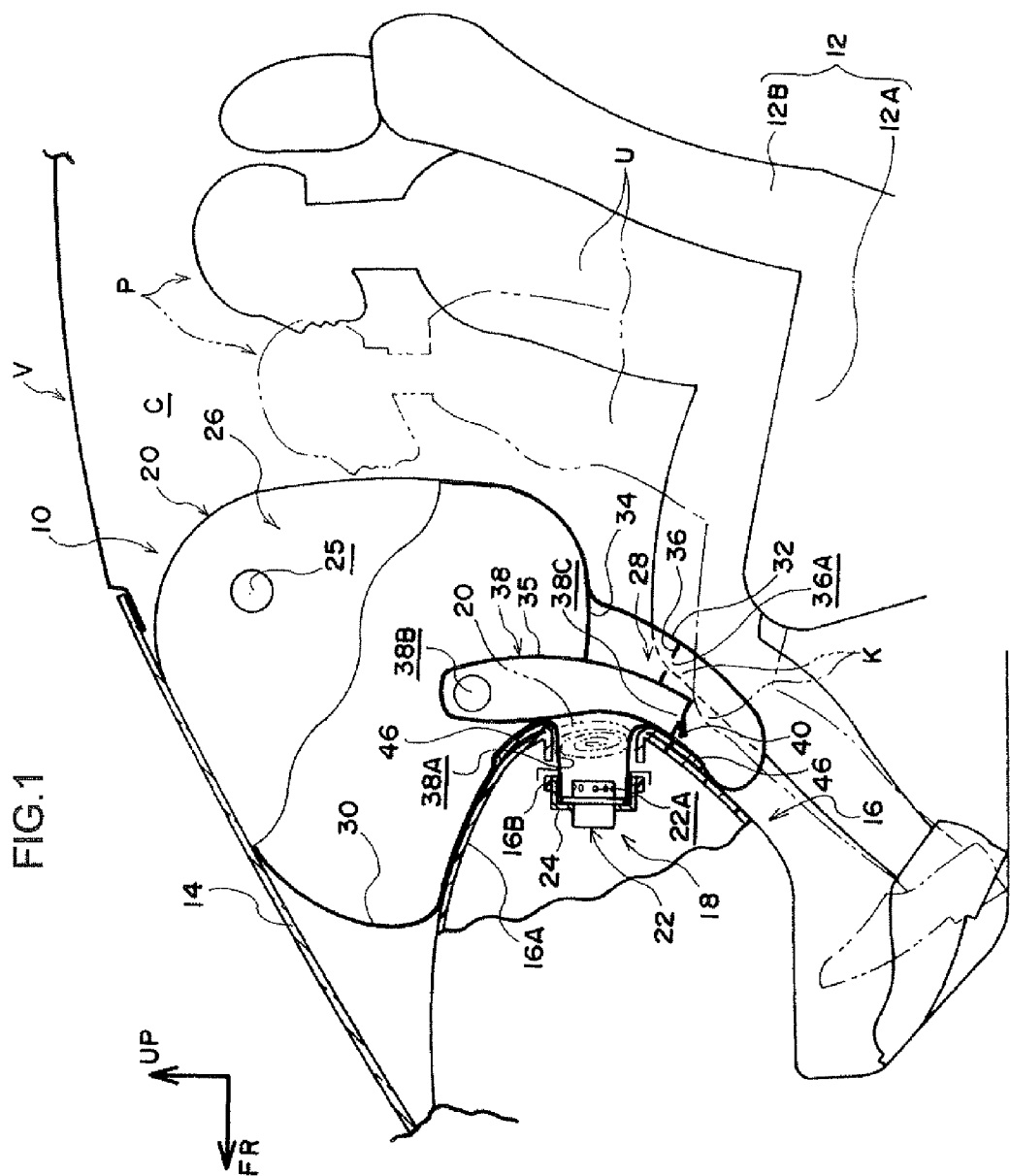
FIG. 1 is a side sectional view schematically showing an airbag expanded state at an airbag device for a passenger's seat relating to a first embodiment of the present invention.

The front portion of a vehicle cabin C interior of the automobile V in an operated state of the airbag device 10 for a passenger's seat is shown in a schematic side sectional view in FIG. 1. As shown in this drawing, the passenger's seat 12 that serves as a seat for a vehicle is disposed at vehicle cabin C interior front portion. The passenger's seat 12 has a seat cushion 12A on which a passenger P sits while facing toward the front of the vehicle, and a seat back 12B that supports, from the vehicle rear side, the passenger P seated on the seat cushion 12A. The passenger's seat 12 is structured such that the posture (position) thereof can be adjusted to postures including a posture at which the passenger P of a large build is seated as shown by the solid lines in FIG. 1, and a posture at which a passenger of a small build is seated as shown by the two-dot chain lines.

A windshield glass 14 that prescribes the vehicle front end of the vehicle cabin C is disposed at the vehicle front side with respect to the passenger's seat 12. Further, an instrument panel 16 is provided at the vehicle lower side with respect to the windshield glass 14. An upper portion 16A in the vehicle vertical direction of the instrument panel 16 projects toward the passenger's seat 12 side, and the passenger P seated in the passenger's seat 12 places his/her legs beneath the upper portion 16A. Accordingly, the vehicle V is structured such that the passenger P seated in the passenger's seat 12 places his/her knees K near to the upper portion 16A of the instrument panel 16.

The airbag device 10 for a passenger's seat has an airbag module 18 that is disposed within the instrument panel 16. The airbag module 18 is structured with an airbag 20 that is described below, an inflator 22 for supplying gas to the airbag 20, and an airbag case 24 that holds (accommodates portions of) the airbag 20 and the inflator 22, being the main portions thereof. At the airbag case 24, the airbag module 18 is held by a mounting portion 16B that is provided at the instrument panel 16.

In this embodiment, as shown in FIG. 1, the airbag 20 has a main bag 26 that serves as a first airbag for protecting an upper body U of the seated passenger P, and a sub-bag (knee airbag) 28 that serves as a second airbag for protecting the knees K. Therefore, in the airbag device 10 for a passenger's seat, the airbag module 18 is provided so as to face toward the rear of the vehicle, in a vicinity of the vehicle rearmost portion at the upper portion 16A of the instrument panel 16.

Concretely, the airbag case 24 is held at the mounting portion 16B in a posture of opening toward the rear of the vehicle, and holds (accommodates a portion of) the airbag 20 that is in a folded-up state as shown by the two-dot chain line in FIG. 1. The folded-up state is maintained due to the airbag 20 being enveloped by a holding sheet or the like that is not illustrated. The inflator 22 is fixedly held by the airbag case 24 in a state in which a portion of the inflator 22, that includes gas jetting ports 22A, is inserted within the airbag 20. In this embodiment, the inflator 22 is a so-called disc-type inflator, and a sufficient volume is ensured with respect to the airbag 20 that has the main bag 26 and the sub-bag 28 as described above.

Figure 2:
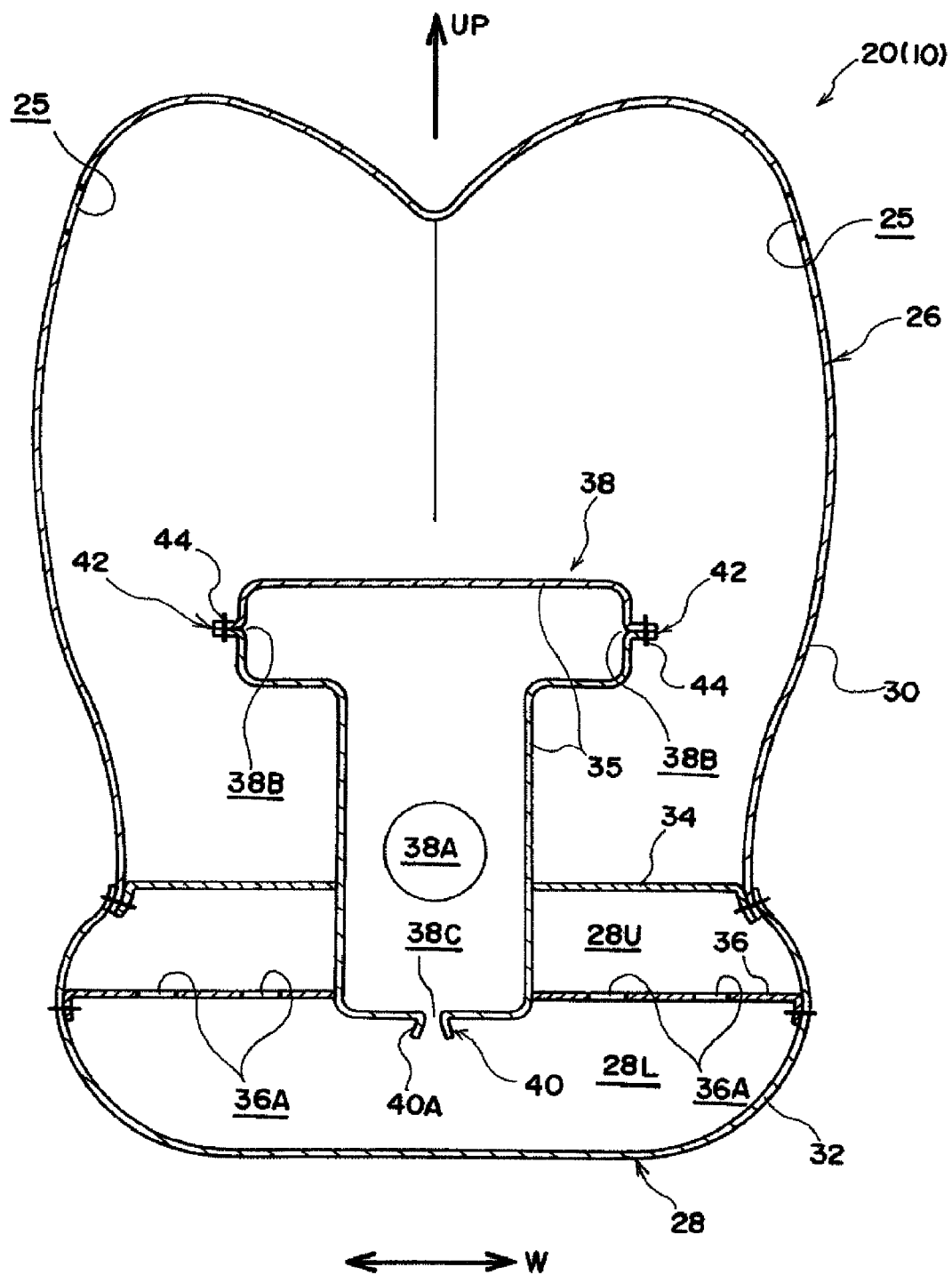
FIG. 2 is a front sectional view of an airbag that structures the airbag device for a passenger's seat relating to the first embodiment of the present invention.

The main bag 26 of the airbag 20 is inflated and expanded between the upper body U of the seated passenger P, and the windshield glass 14 and the instrument panel 16, and restrains relative movement of the upper body U toward the front of the vehicle. In this embodiment, a vent hole 25 for internal pressure adjustment is formed at the main bag 26. The sub-bag 28 is inflated and expanded between the instrument panel 16 (the upper portion 16A) and the knees K, and restrains relative movement of the knees K toward the front of the vehicle. The main bag 26 and the sub-bag 28 of the airbag 20 are structured integrally as shown in FIG. 2.

Concretely, the main bag 26 is formed, so as to inflate and expand in the shape of a bag, of a base cloth 30 that structures the vehicle vertical direction upper portion and intermediate portion at the airbag 20. In this embodiment, the main bag 26 is an airbag of a so-called twin chamber structure as if left and right bags that are adjacent in the vehicle transverse direction are connected. The main bag 26 is formed such that the vehicle rear ends of the left and right bags (chambers) respectively restrain the left and right separate shoulder portions (or vicinities thereof) of the seated passenger P.

The sub-bag 28 is formed by a base cloth 32 and in the shape of a bag that opens toward the top of the vehicle, and the opening edge is joined by sewing or the like to the vehicle lower side opening edge of the main bag 26. Due thereto, the airbag 20 is formed on the whole in the shape of a large bag. The base cloth 32 differs from the base cloth 30 with respect to the point that the surface of the base cloth 32 is subjected to a weave sealing processing such as silicon coating or the like, and gas leaks from the main bag 26 interior through the weave are prevented (suppressed as compared with the base cloth 30). From the standpoint of preventing gas leaks, it is preferable to carry out silicon coating for maintaining the internal pressure of the sub-bag 28 on the inner surface of the sub-bag 28.

The airbag 20, that is expanded in the shape of a large bag on the whole as described above, has a tether 34 serving as a cloth-like material for demarcating (separating) the interior of the airbag 20 into the chamber of the main bag 26 and the chamber of the sub-bag 28. The tether 34 forms a cloth shape, and, as shown in FIG. 1, limits the inflation in the vehicle longitudinal direction of the sub-bag 28. In this embodiment, the tether 34 is joined by sewing or the like to the sewn portion of the base cloth 30 and the base cloth 32.

Moreover, a tether 36 serving as a partitioning cloth is provided at the portion that becomes the substantially intermediate portion in the vehicle vertical direction in the expanded state at the sub-bag 28 interior. The tether 36 forms two chambers 28U, 28L that are demarcated in the vehicle vertical direction within the chamber of the sub-bag 28, and, as shown in FIG. 1, limits the inflation in the vehicle longitudinal direction of the sub-bag 28. Communication holes 36A, that serve as plural communication paths for communicating the chambers 28U, 28L, are formed at the tether 36.

Further, the airbag 20 that structures the airbag device 10 for a passenger's seat has an inner tube 38 that serves as a gas flow path member that is flexible and that leads gas of the inflator 22 directly to the main bag 26, the sub-bag 28 respectively. The inner tube 38 is formed by a base cloth 35, that is a similar fabric as the base cloth 30, and as a tube body and independently from the main bag 26, the sub-bag 28 that receive the supply of gas and are inflated and expanded. The inner tube 38 has a gas entrance 38A into which gas of the inflator 22 is supplied (flows-in), main-side gas exits 38B that open to the main bag 26 interior, and a sub-side gas exit 38C that opens to the sub-bag 28 interior.

In this embodiment, the inner tube 38 is folded-up within the main bag 26, the sub-bag 28 together with the main bag 26, the sub-bag 28, so as to be substantially wholly inflated and expanded within the main bag 26, the sub-bag 28. The inner tube 38 passes through the tether 34 in a state of being sealed by sewing or the like, and the gas exits 38B are positioned within the main bag 26, and the gas exit 38C is positioned within the sub-bag 28. Due thereto, at the airbag 20, through the inner tube 38, gas from the inflator 22 is directly supplied to the main bag 26 from the gas exits 38B, and the gas from the inflator 22 is directly supplied to the sub-bag 28 from the gas exit 38C.

Further, in this embodiment, the inner tube 38 is structured so as to also pass through the tether 36, and the gas from the inflator 22 is directly supplied to the chamber 28L. Moreover, in this embodiment, the inner tube 38 forms a substantial "T" shape in front view, and the gas exit 38C is formed at the lower end thereof, and the gas exits 38B are formed respectively at the vehicle transverse direction both ends at the upper end. Due thereto, at the airbag 20, gas is supplied toward the vehicle transverse direction both sides with respect to the main bag 26, and gas is supplied downward in the vehicle vertical direction with respect to the sub-bag 28.

Moreover, as shown in FIG. 2, at the inner tube 38, the gas entrance 38A is formed between the gas exits 38B and the gas exit 38C in the vehicle vertical direction. In other words, the inner tube 38 is structured such that the gas path from the inflator 22 is forked-off to the gas exits 38B side and to the gas exit 38C.

Further, in the airbag device 10 for a passenger's seat, a check valve (one-way valve) 40 serving as a gas discharge suppressing structure is formed at the gas exit 38C that is the side communicating with the sub-bag 28 with respect to the aforementioned forked-off portion at the inner tube 38. The check valve 40 has cloth pieces 40A that cover the gas exit 38C from the chamber 28L interior (the outer side of the inner tube 38), and permits the supply of gas from the inner tube 38 through the gas exit 38C to the sub-bag 28. On the other hand, the check valve 40 is structured such that, when the internal pressure (dynamic pressure) of the sub-bag 28 becomes higher than the internal pressure of the inner tube 38, the cloth pieces 40A close the gas exit 38C by the internal pressure.

Moreover, in the airbag device 10 for a passenger's seat, main bag expansion delaying structures 42 serving as communication delaying structures are provided. The main bag expansion delaying structures 42 are structured with the main portions thereof being tear seams 44 that respectively close, by sewing, the formed portions of the respective gas exits 38B that are the sides communicating with the main bag 26 with respect to the aforementioned forked portion at the inner tube 38. When the internal pressure of the inner tube 38 exceeds a predetermined value, the tear seams 44 are ruptured and open the corresponding gas exits 38B. Due thereto, the airbag device 10 for a passenger's seat is structured such that the timing of starting the supply of gas to the main bag 26 is delayed with respect to the timing of starting the supply of gas to the sub-bag 28.

As shown in FIG. 1, airbag doors 46, that are ruptured and open due to the inflation and expansion pressure of the airbag 20, are formed at the portion where the airbag module 18 is mounted at the instrument panel 16. Due to the instrument panel 16 tearing-open groove-shaped tear lines formed at the inner surface side thereof, the airbag doors 46 relating to this embodiment are expanded upward and downward with hinge portions as axes, and form an opening in the instrument panel 16. The inflation and expansion of the airbag 20 toward the instrument panel 16 exterior, i.e., toward the vehicle cabin C, are permitted through this opening.

In the above-described airbag device 10 for a passenger's seat, when a front collision of the vehicle V is detected or a front collision being unavoidable is predicted on the basis of output of an unillustrated collision sensor for example, an unillustrated airbag ECU serving as a control device causes the inflator 22 to operate.

Operation of the present embodiment is described next.

In the airbag device 10 for a passenger's seat of the above-described structure, when a front collision of the vehicle V is detected or predicted on the basis of a signal from the collision sensor, the airbag ECU causes the inflator 22 to operate (ignite). Then, the airbag 20 that receives the gas supply from the inflator 22 is inflated within the instrument panel 16, and due to the expansion pressure thereof, expands the airbag doors 46 and passes through the formed opening and inflates and expands at the vehicle cabin C.

Figure 3:
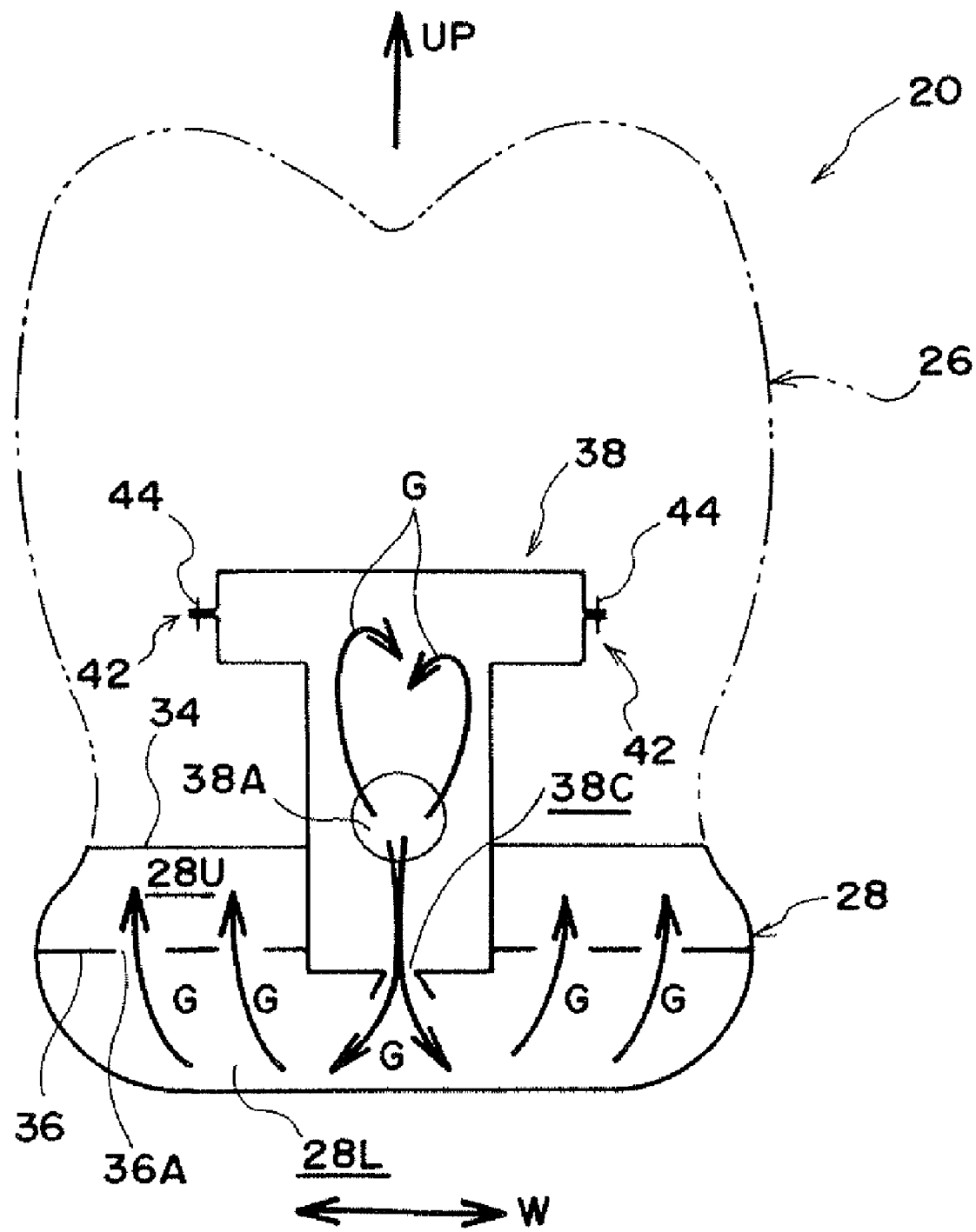
FIG. 3 is a front sectional view schematically showing a gas supplied state to a sub-bag of the airbag that structures the airbag device for a passenger's seat relating to the first embodiment of the present invention.

At this time, the inner tube 38, to which gas of the inflator 22 is supplied from the gas entrance 38A, is first inflated and expanded, and, as shown in FIG. 3, the gas that has passed through the inner tube 38 is supplied from the gas exit 38C to the chamber 28L of the sub-bag 28 (refer to arrows G). Then, the sub-bag 28 is inflated and expanded from the chamber 28L at the distal end side (the lower side). Further, the sub-bag 28 is inflated and expanded also at the chamber 28U side at the upper side by the gas that is supplied from the chamber 28L at the lower side through the plural communication holes 36A to the chamber 28U at the upper side. Due thereto, in the airbag device 10 for a passenger's seat, expansion of the sub-bag 28 is completed in a short time from the detection of a front collision.

Figure 4:
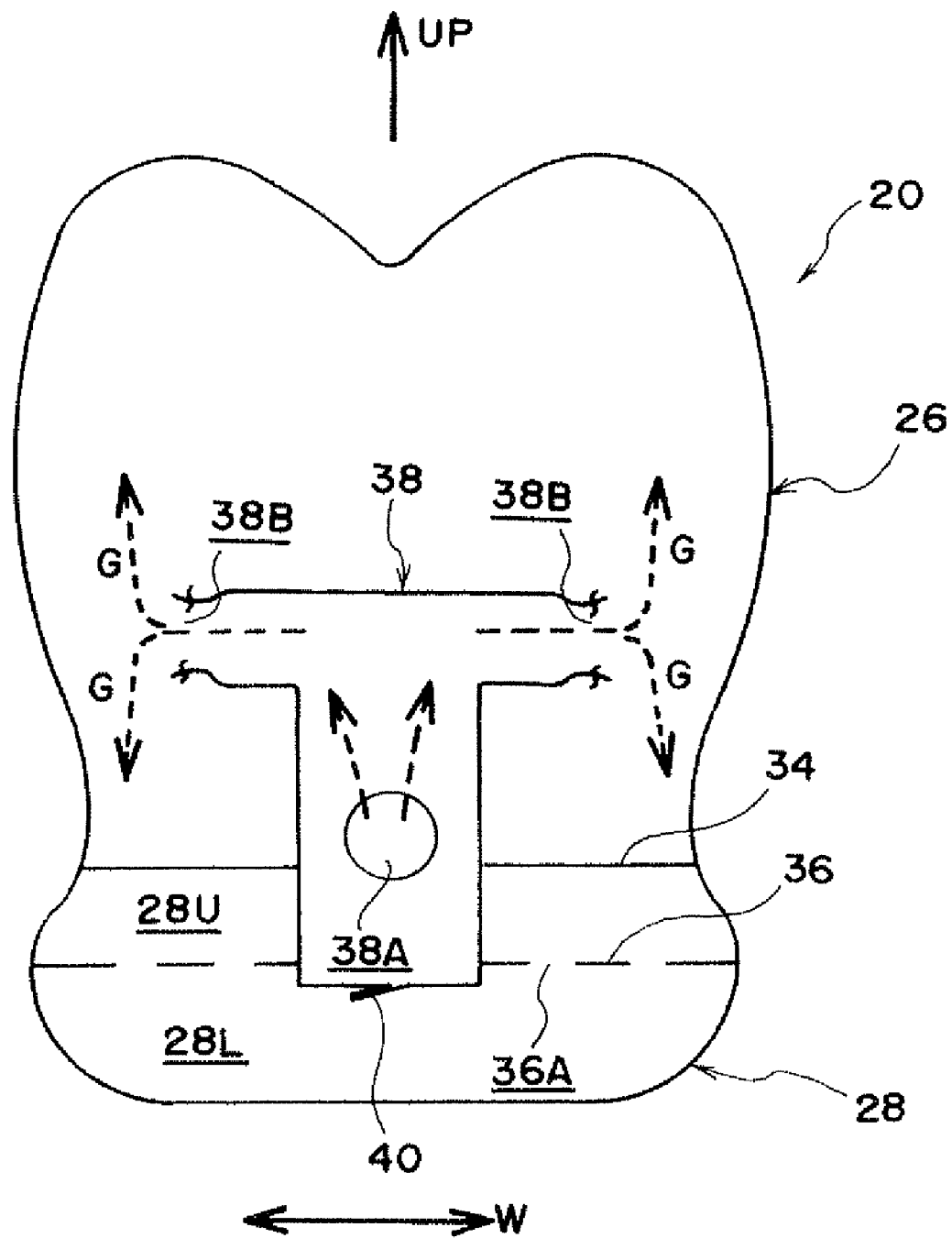
FIG. 4 is a front sectional view schematically showing a gas supplied state to a main bag of the airbag that structures the airbag device for a passenger's seat relating to the first embodiment of the present invention.

Further, when the internal pressure of the inner tube 38 exceeds a predetermined value in the process of expansion or after completion of expansion of the sub-bag 28, the tear seams 44 are ruptured, and, as shown in FIG. 4, the gas exits 38B are opened. The gas of the inflator 22 is supplied from the gas exits 38B to the main bag 26 (refer to arrows G), and the main bag 26 is inflated and expanded.

Here, in the airbag device 10 for a passenger's seat, the inner tube 38 is provided at the airbag 20 that has the main bag 26 and the sub-bag 28. Therefore, in the airbag device 10 for a passenger's seat, the gas from the inflator 22 is directly (independently) supplied to the main bag 26 and the sub-bag 28, respectively. Further, in the airbag device 10 for a passenger's seat, due to the inner tube 38 passing through the tether 34 that forms the partitioning wall of the main bag 26 and the sub-bag 28, the gas exit 38C of the inner tube 38 is opened within the sub-bag 28.

For these reasons, in the airbag device 10 for a passenger's seat, the sub-bag 28 that has a relatively small volume is inflated and expanded in a short time from the operation of the inflator 22. In particular, in the airbag device 10 for a passenger's seat, due to the inner tube 38 passing through the tether 34 and also the tether 36 that limits the expanded shape of the sub-bag 28, gas of the inflator 22 is supplied to the chamber 28L at the most distal end. Accordingly, in the airbag device 10 for a passenger's seat, the sub-bag 28 is inflated and expanded in order from the distal end while the distal end side is moved downward (toward the vehicle front side of the knees K). Further, in particular, in the airbag device 10 for a passenger's seat, the main bag expansion delaying structures 42 (the tear seams 44) are provided at the gas exit 38B sides at the inflator 38. Therefore, gas of the inflator 22 is supplied to the sub-bag 28 selectively (preferentially) until the tear seams 44 are ruptured.

As described above, in the airbag device 10 for a passenger's seat, the sub-bag 28 can be inflated and expanded in a short time from the detection of a front collision, at the vehicle front side of the knees K of the seated passenger P at which the space (stroke) in the vehicle longitudinal direction is small. Due to the sub-bag 28, the knees K are restrained, and the load applied to the knees K from the instrument panel 16 side is lessened. Namely, the knees K of the seated passenger P are protected.

In particular, in the airbag device 10 for a passenger's seat, because the check valve 40 is provided at the gas exit 38C side at the inner tube 38, when the internal pressure of the sub-bag 28 rises accompanying the restraining of the knees K, the check valve 40 closes the gas exit 38C. Therefore, a drop in internal pressure of the sub-bag 28 (discharging of gas) that accompanies the restraining of the knees K is suppressed, and the knees K of the seated passenger P are protected even better.

On the other hand, the upper body U of the passenger P is restrained by the main bag 26 that is inflated and expanded, and impact absorption is achieved. For these reasons, the passenger P is protected well by the airbag device 10 for a passenger's seat. In particular, in the airbag device 10 for a passenger's seat, as shown in FIG. 4, gas is supplied (jetted-out) through the pair of left and right gas exits 38B toward the vehicle transverse direction both sides within the main bag 26. Therefore, as compared with a structure in which gas is supplied toward the rear of the vehicle, the expansion force (expansion speed), toward the rear of the vehicle, of the main bag 26 is suppressed, and the load is lessened at the time of restraining the upper body U of the seated passenger P.

Further, in the airbag device 10 for a passenger's seat, due to the inner tube 38 that is folded-up together with the main bag 26 and the sub-bag 28 being inflated and expanded, the gas from the inflator is directly supplied from the inner tube 38 to the main bag 26 and the sub-bag 28, respectively. Namely, by a simple airbag structure and without relying on an external structure of the airbag 20, gas can be supplied directly (independently) to the main bag 26 and the sub-bag 28 respectively, which contributes to good protection of the upper body U and the knees K of the seated passenger P as described above.

In this way, in the present airbag device 10 for a passenger's seat, the upper body and the knees of the passenger can be protected effectively by a simple airbag structure.

Further, in the airbag device 10 for a passenger's seat, the total volume of the main bag 26 and the sub-bag 28 is constant without depending on the supply path of the gas. Therefore, although the airbag device 10 for a passenger's seat is a structure that inflates and expands the sub-bag 28 in a short time as described above, the time until completion of expansion of the main bag 26 does not become long. Further, in the airbag device 10 for a passenger's seat, because the inner tube 38 is a structure that is inflated and expanded at the interiors of the main bag 26 and the sub-bag 28, the inner tube 38 bears a portion of the volume of the main bag 26 and the sub-bag 28. Therefore, the airbag 20 that includes the main bag 26 and the sub-bag 28 can be expanded on the whole in a short time (by a small amount of gas).

Moreover, in the airbag device 10 for a passenger's seat, because the plural communication holes 36A are formed at the tether 36, the gas, that has been supplied to the chamber 28L at the lower side, is supplied to the chamber 28U at the upper side through the communication holes 36A as described above. Due thereto, the sub-bag 28 is inflated and expanded in order from the distal end side as described above. Further, the structure as simple as compared with a structure having the gas exits 38C at the both sides of the tether 36 at the inner tube 38.

Figure 5:
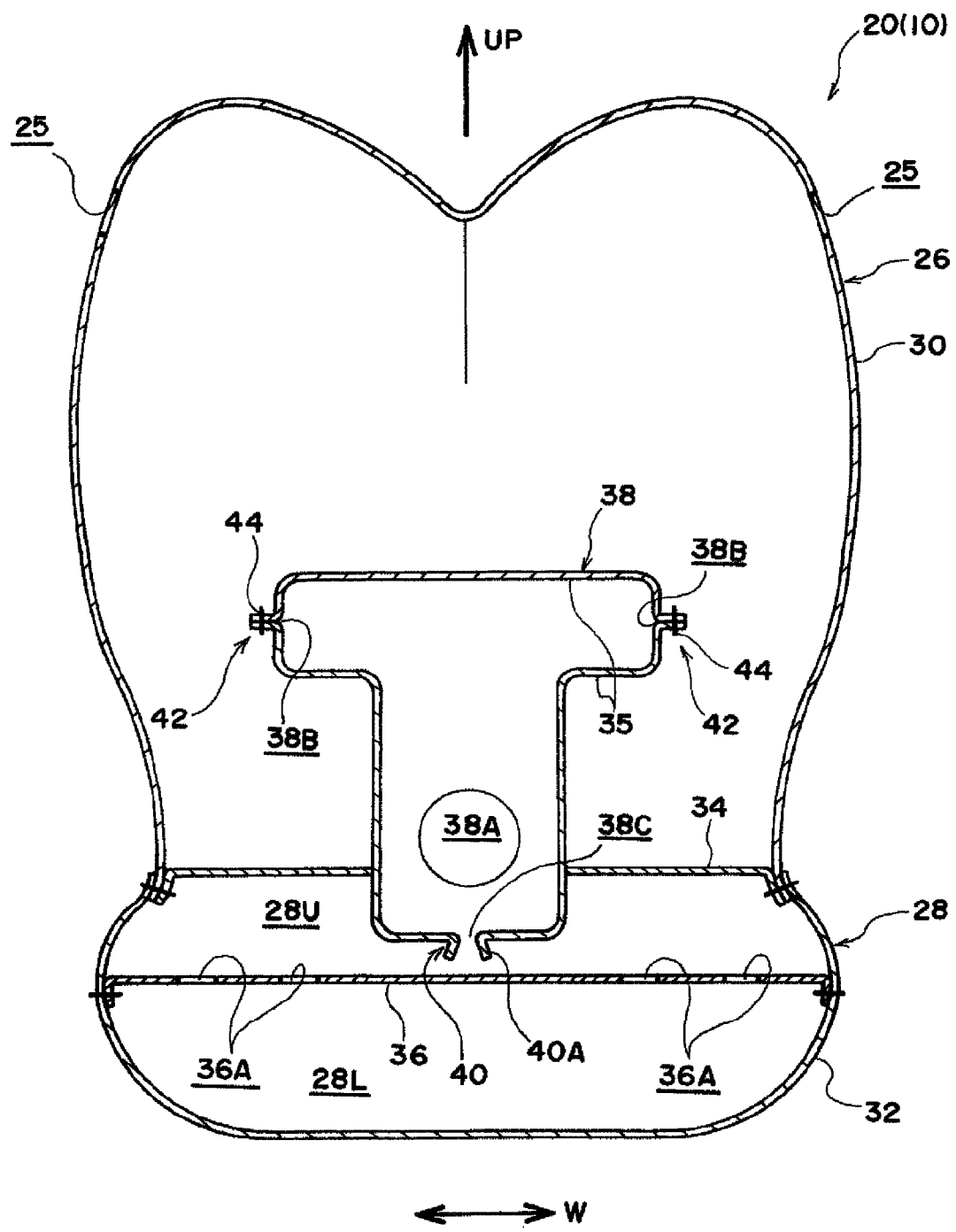
FIG. 5 is a front sectional view showing a first modified example of the airbag that structures the airbag device for a passenger's seat relating to the first embodiment of the present invention.

Note that the above first embodiment describes an example in which gas is supplied from the gas exit 38C to the chamber 28L at the lower side, but the present invention is not limited to this, and, for example, may be a structure in which the gas exit 38C is opened at the chamber 28U at the upper side as shown in FIG. 5. In this structure, the sub-bag 28 is inflated and expanded before the main bag 26 as described above, and itself is inflated and expanded in order from the vehicle upper side. It suffices to set which of the upper side or the lower side of the tether 36 the gas exit 38C opens at in accordance with the shape of the instrument panel 16 (the upper portion 16A), and the dimensions and shape, the placement, and the like of the passenger's seat 12.

Figure 6:
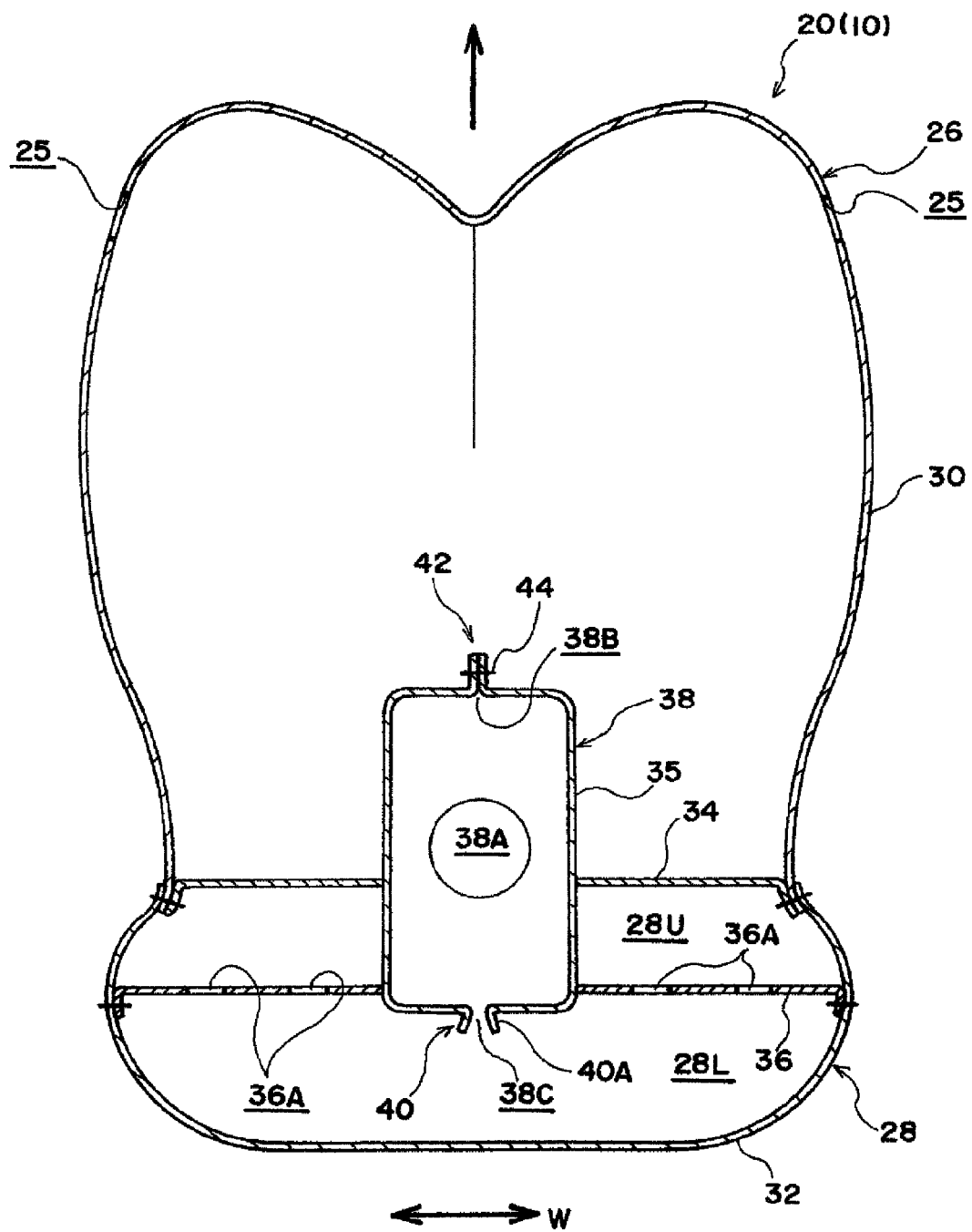
FIG. 6 is a front sectional view showing a second modified example of the airbag that structures the airbag device for a passenger's seat relating to the first embodiment of the present invention.

Further, the above first embodiment describes an example in which the pair of left and right gas exits 38B are provided, but the present invention is not limited to this, and, for example, may be a structure in which the inner tube 38 has the single gas exit 38B (tear seam 44) as shown in FIG. 6. In this case, it is desirable that the gas exit 38B be a structure that supplies gas toward the vehicle upper side rather than a structure that supplies gas toward the vehicle rear side. Note that it goes without saying that there may be a structure in which three or more of the gas exits 38B are provided.

Figure 7:
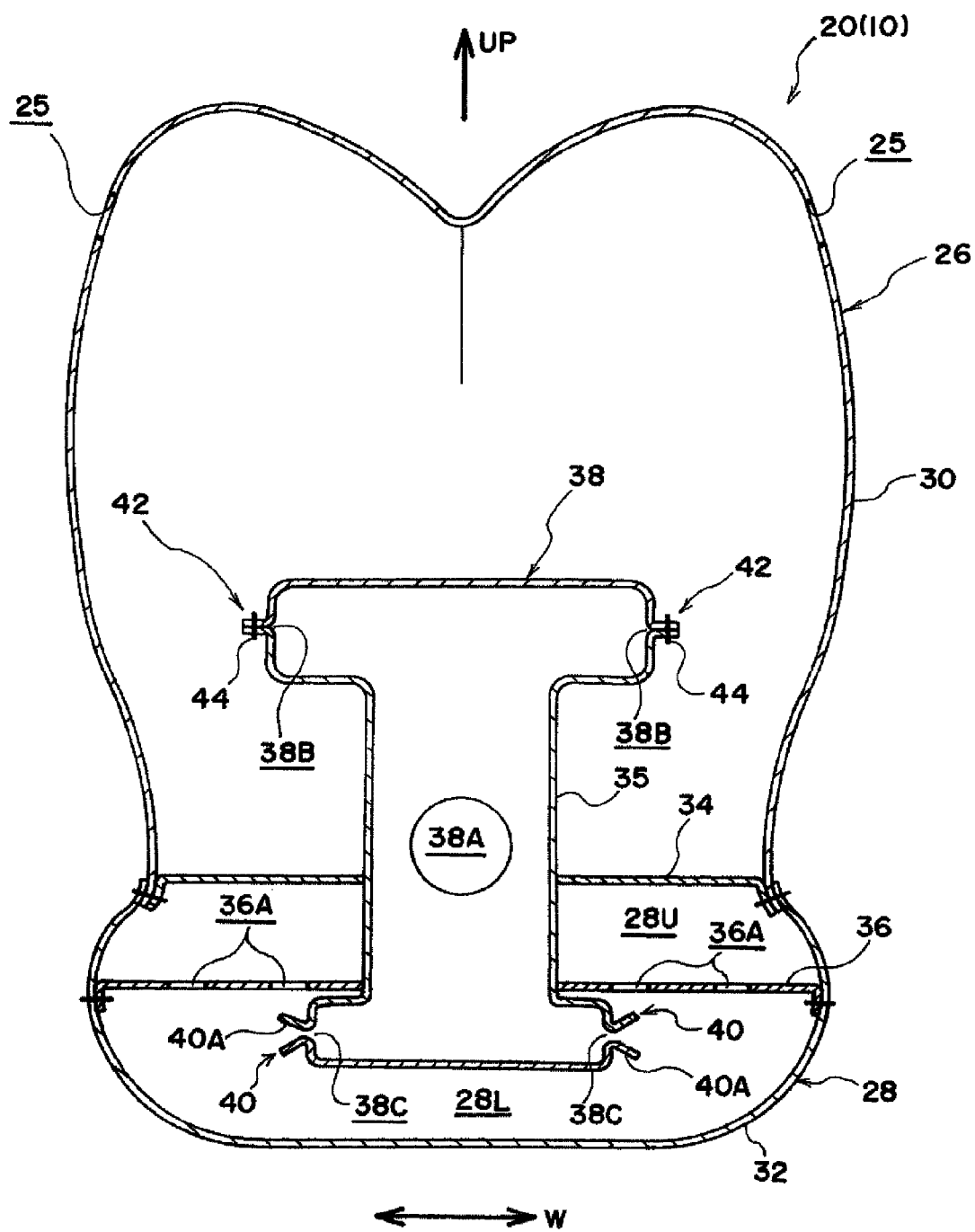
FIG. 7 is a front sectional view showing a third modified example of the airbag that structures the airbag device for a passenger's seat relating to the first embodiment of the present invention.

Moreover, the above first embodiment describes an example in which the single gas exit 38C is provided, but the present invention is not limited to this, and, for example, may be a structure in which plural (two in the illustrated example) of the gas exits 38C are provided as shown in FIG. 7. In this case, it is desirable that the gas exits 38C be structures that supply gas in the vehicle transverse direction or toward the vehicle lower side.

Other embodiments of the present invention are described next. Note that there are cases in which parts/portions that are basically the same as the structures of the above-described first embodiment or that were previously described are denoted by the same reference numerals as the structures of the above-described first embodiment or the structures that were previously described, and description thereof is omitted.

Second Embodiment

Figure 8:
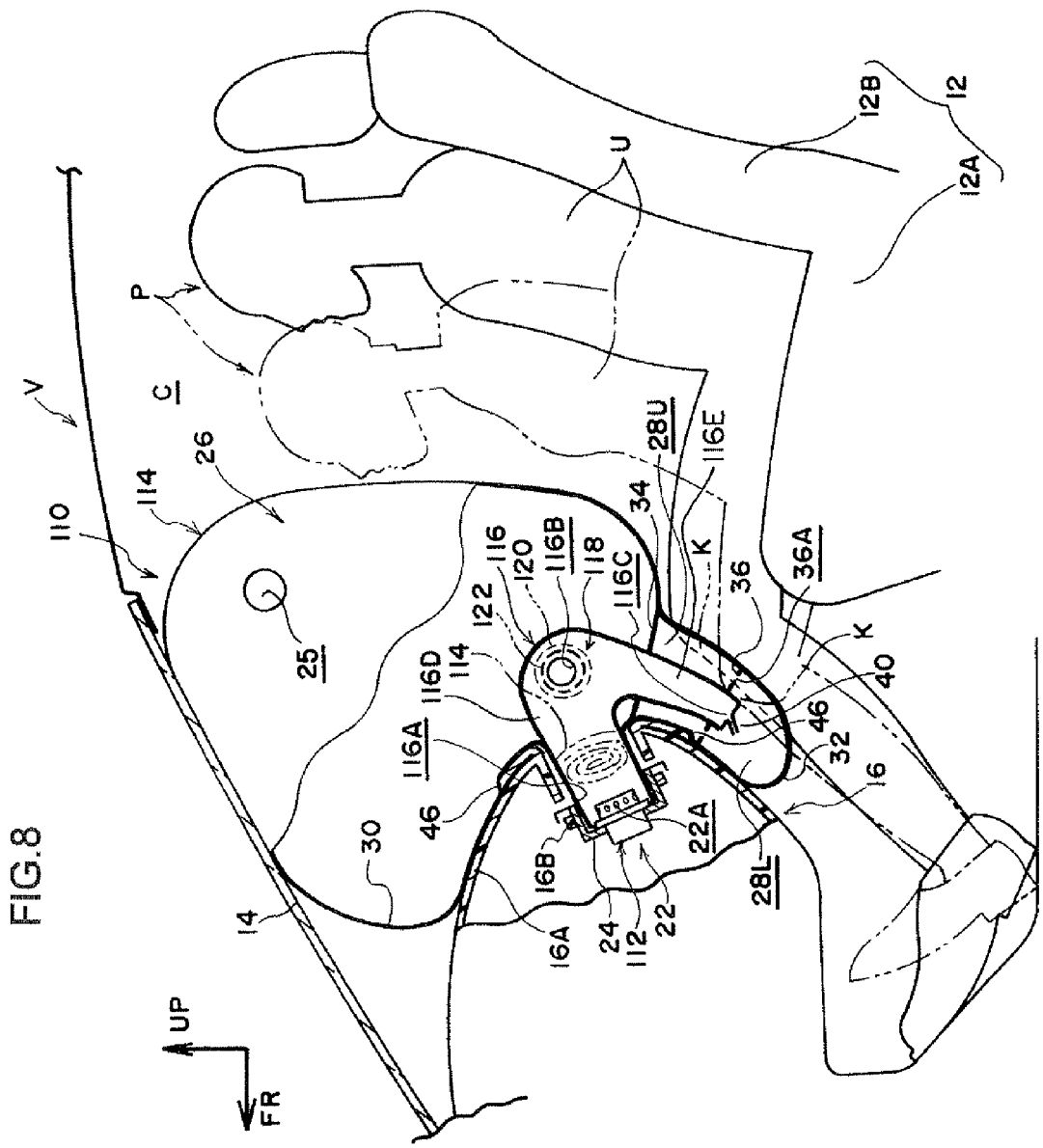
FIG. 8 is a side sectional view schematically showing an airbag expanded state at an airbag device for a passenger's seat relating to a second embodiment of the present invention.

The operated state of an airbag device 110 for a passenger's seat relating to a second embodiment of the present invention is shown in a schematic side sectional view in FIG. 8. As shown in this drawing, the airbag device 110 for a passenger's seat differs from the airbag device 10 for a passenger's seat relating to the first embodiment with regard to the point that the airbag device 110 for a passenger's seat has an airbag module 112, in which the airbag case 24 is supported at the instrument panel 16 in a posture of being open toward the vehicle rear side and the vehicle upper side, instead of the airbag module 18 in which the airbag case 24 is supported at the instrument panel 16 in a posture of being open toward the vehicle rear side.

Figure 22:
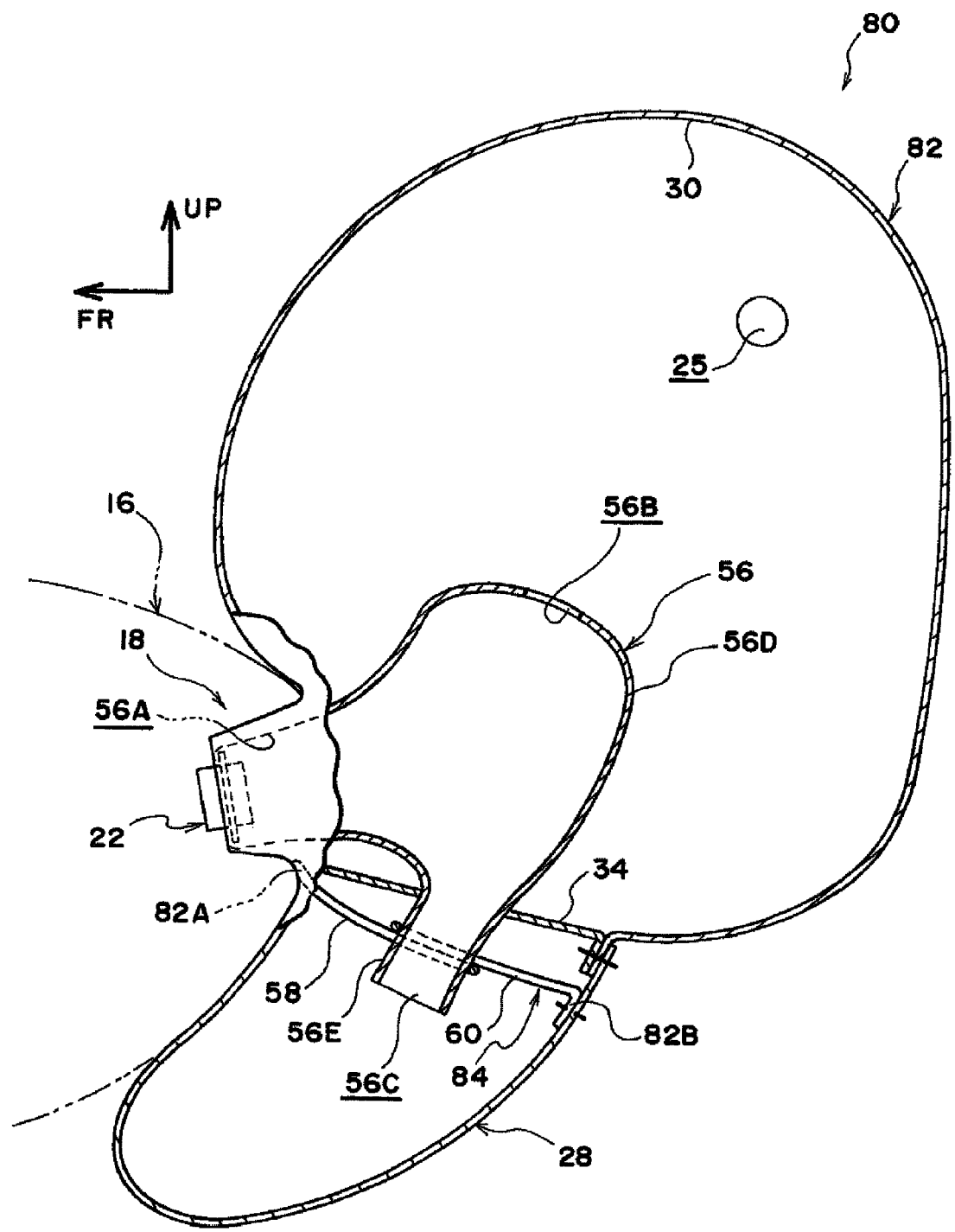
FIG. 22 is a side sectional view schematically showing an airbag expanded state at an airbag device for a passenger's seat relating to a sixth embodiment of the present invention.

Further, an airbag 114 that structures the airbag module 112 of the airbag device 110 for a passenger's seat has an inner tube 116 instead of the inner tube 38. As shown in FIG. 22, the inner tube 116 is expanded in a substantial "U" shape that opens toward the vehicle front side and the vehicle lower side, and supplies the gas from the inflator 22 to the main bag 26 and the sub-bag 28. Concretely, the inner tube 116 is a structure that extends from the airbag case 24, that opens toward the vehicle rear side and the vehicle upper side as described above, in those directions of opening, and is expanded so as to be folded-back toward the vehicle front side and the vehicle lower side.

The inner tube 116 is formed by the base cloth 30 in the shape of a tube or the shape of a bag that receives a supply of gas and is inflated and expanded, and has a gas entrance 116A to which gas of the inflator 22 is supplied, one or plural gas exits 116B that open within the main bag 26, and a gas exit 116C that opens within the sub-bag 28. In this embodiment, a pair (two) of the gas exits 116B are provided toward both sides in the vehicle transverse direction. The gas exit 116C is formed at the distal end of a tube portion (narrow tube-shaped portion) 116E that extends from a main body 116D that is bag-shaped (relatively big tube-shaped) at the inner tube 116. In this embodiment, the tube portion 116E passes through the tether 34.

Further, in the airbag device 110 for a passenger's seat, the check valve (one-way valve) 40 serving as a gas discharge suppressing structure is formed at the gas exit 116C at the inner tube 116. The check valve 40 has the cloth pieces 40A that cover the gas exit 116C from the interior of the chamber 28L at the lower side (the outer side of the inner tube 116), and permit the supply of gas from the inner tube 116 through the gas exit 116C to the sub-bag 28. On the other hand, the check valve 40 is structured such that, when the internal pressure (dynamic pressure) of the sub-bag 28 becomes higher than the internal pressure of the inner tube 116, the cloth pieces 40A close the gas exit 116C due to this internal pressure.

Moreover, the airbag device 110 for a passenger's seat is provided with main bag expansion delaying structures 118 that serve as communication delaying structures. The main bag expansion delaying structures 118 are structured by cloth pieces 120, that close the window portions that form the pair of gas exits 116B at the inner tube 116, being sewn to the main body 116D at tear seams 122. When the internal pressure of the inner tube 116 exceeds a predetermined value, the tear seams 122 are ruptured and open the gas exits 116B (cancel the closed states by the cloth pieces 120). Due thereto, the airbag device 110 for a passenger's seat is structured such that the timing of starting the supply of gas to the main bag 26 is delayed with respect to the timing of starting the supply of gas to the sub-bag 28.

The other structures at the airbag device 110 for a passenger's seat, including portions that are not illustrated, are basically the same as the corresponding structures of the airbag device 10 for a passenger's seat. Accordingly, by the airbag device 110 for a passenger's seat relating to the second embodiment as well, similar effects can be obtained by operation that is basically similar to the airbag device 10 for a passenger's seat relating to the first embodiment.

Third Embodiment

Figure 9:
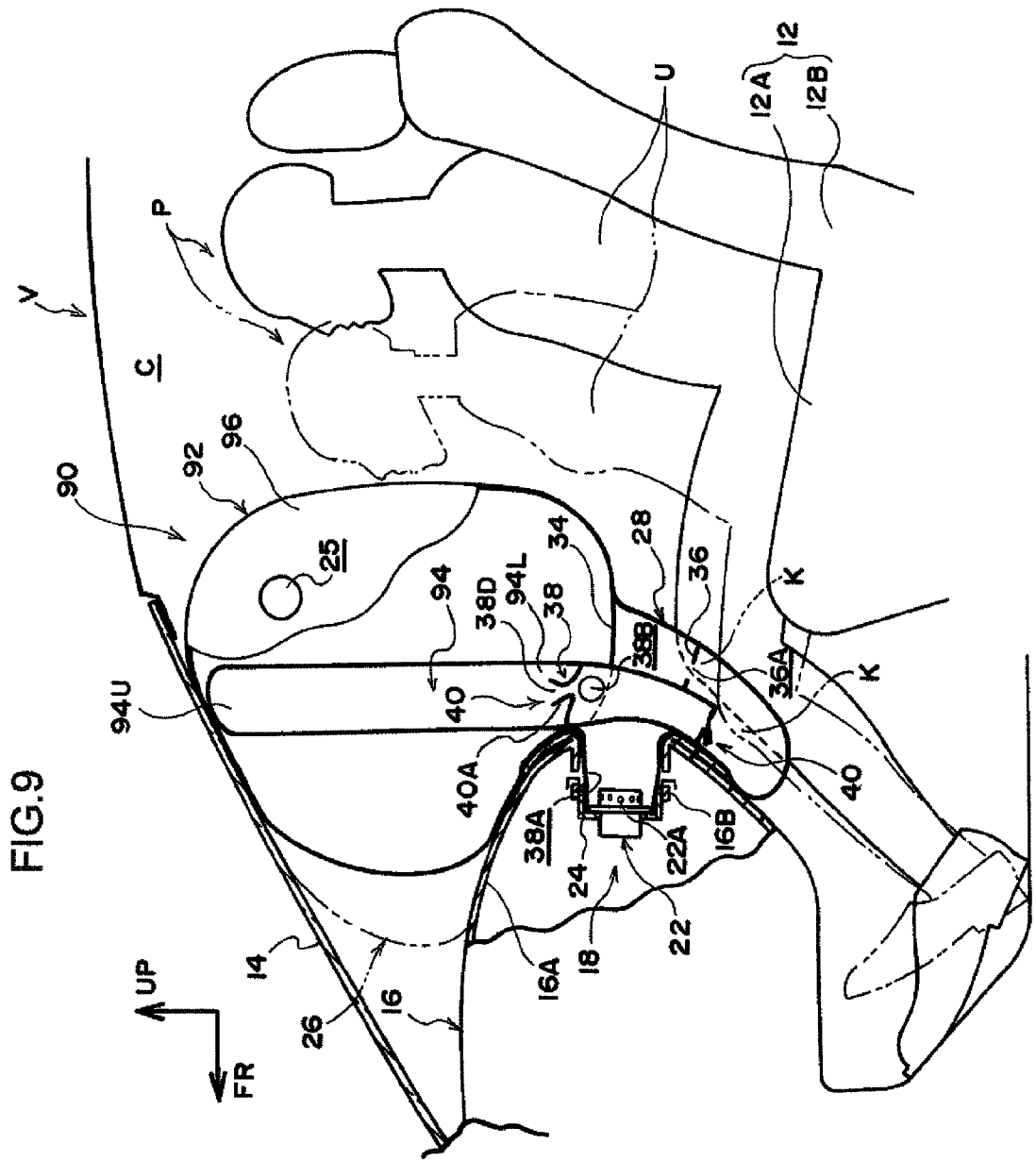
FIG. 9 is a side sectional view schematically showing an airbag expanded state at an airbag device for a passenger's seat relating to a third embodiment of the present invention.
Figure 10:
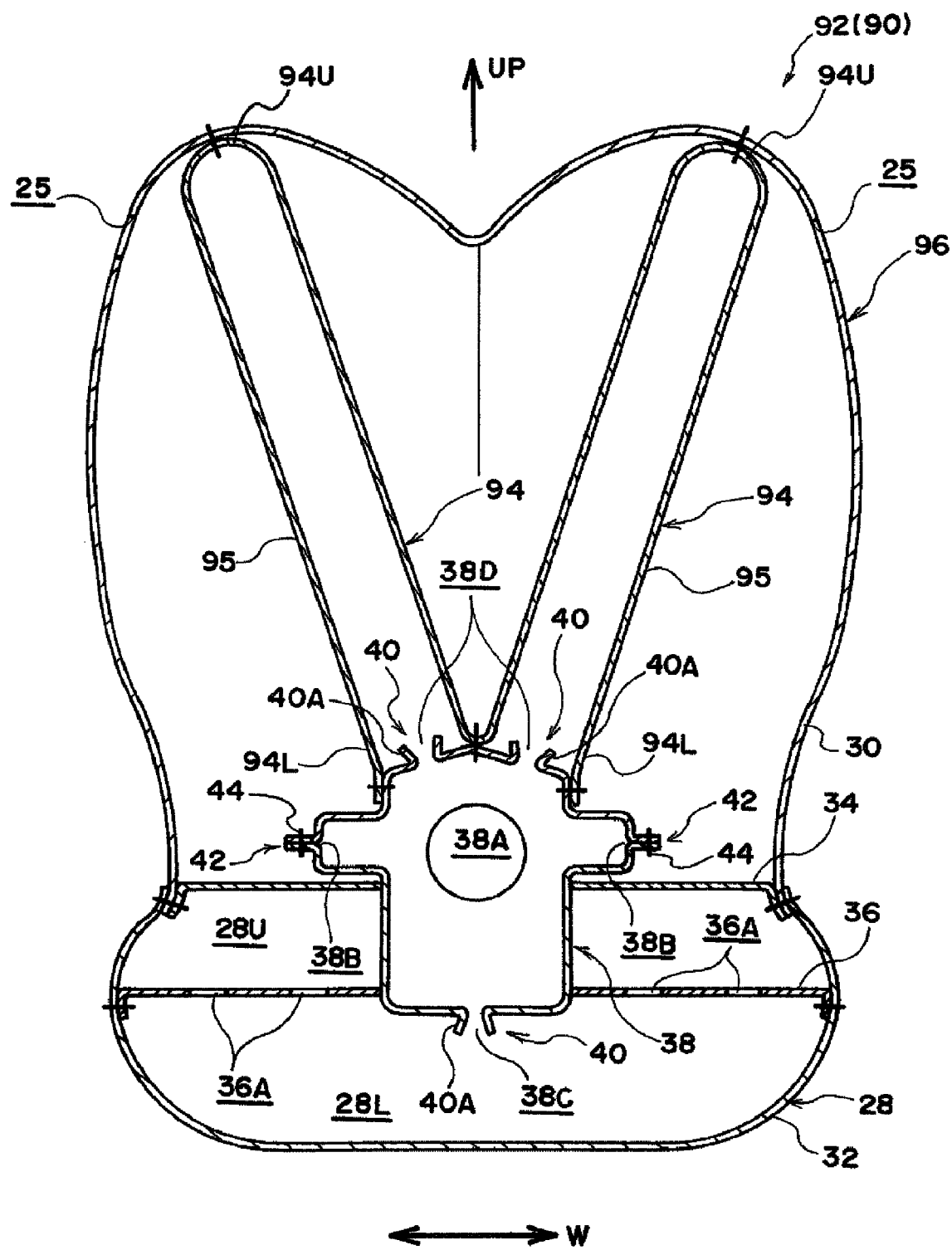
FIG. 10 is a front sectional view of an airbag that structures the airbag device for a passenger's seat relating to the third embodiment of the present invention.

The operated state of an airbag device 90 for a passenger's seat relating to a third embodiment of the present invention is shown in a schematic side sectional view in FIG. 9. Further, an airbag 92 that structures the airbag device 90 for a passenger's seat is shown in FIG. 10 in a front sectional view corresponding to FIG. 2. As shown in these drawings, with regard to the point that the airbag 92 at the airbag device 90 for a passenger's seat has reaction force supporting tubes 94 serving as in-bag expanding portions, the airbag 92 differs from the airbag device 10 for a passenger's seat that is equipped with the airbag 20 that does not have these. Concrete description is given hereinafter.

The reaction force supporting tubes 94 are disposed within a main bag 96 that serves as the first airbag, and are formed from a base cloth 95 and as tubes that are independent from the main bag 96. Lower end portions 94L in the vehicle vertical direction of the reaction force supporting tubes 94 communicate, in a state of being sealed by sewing or the like, with the upper end of the inner tube 38. The communicating portions with the reaction force supporting tubes 94 at the inner tube 38 are gas exits 38D at the high pressure side, and the check valves 40 serving as gas discharge suppressing structures for in-bag expanding portions are formed at these gas exits 38D. The check valves 40 have the cloth pieces 40A that cover the gas exits 38D from the reaction force supporting tube 94 interiors (the outer side of the inner tube 38). When the internal pressure (dynamic pressure) of the reaction force supporting tube 94 becomes higher than the internal pressure of the inner tube 38, the cloth pieces 40A close the gas exit 38C due to this internal pressure.

On the other hand, upper end portions 94U in the vehicle vertical direction of the reaction force supporting tubes 94 are joined by sewing or the like to portions forming the ceiling in the expanded state at the main bag 96. FIG. 10 illustrates an example in which the reaction force supporting tubes 94 have ceiling portions that are independent from the main bag 96, but the reaction force supporting tubes 94 may be structured to, together with the main bag 96, commonly use the base cloth 30 of the ceiling portions. The reaction force supporting tubes 94 are folded-up and accommodated in the airbag case 24 together with the other structural portions of the airbag 92 (mainly the main bag 96, the sub-bag 28, the inner tube 38).

Further, the reaction force supporting tubes 94 are formed so as to be inflated and expanded in substantial circular shapes in cross-section. At the reaction force supporting tubes 94 in the inflated and expanded state, the lower end portions 94L in the vehicle vertical direction face the instrument panel 16 at the vehicle rear side, and the upper end portions 94U in the vehicle vertical direction face the windshield glass 14 at the vehicle rear side. Accordingly, the reaction force supporting tubes 94 are pushed-against the instrument panel 16 and the windshield glass 14 in a state in which the main bag 96 restrains the upper body U of the passenger P. At the airbag device 90 for a passenger's seat, there is a structure in which the reaction force, that arises accompanying the restraining of the upper body U by the main bag 96, is supported by the reaction force supporting tubes 94.

Further, in this embodiment, plural (two of the) reaction force supporting tubes 94 are provided so as to be lined-up in the vehicle transverse direction. The respective reaction force supporting tubes 94 are disposed substantially symmetrically to the left and the right such that the upper end portions 94U are greatly separated in the vehicle transverse direction as compared with the lower end portions 94L. Namely, the two reaction force supporting tubes 94 are disposed so as to form a "V" shape. In other words, the two reaction force supporting tubes 94 are disposed such that both outer edges in the vehicle transverse direction of the in-bag expanding portions that are formed by the two reaction force supporting tubes 94 form a "V" shape.

In this embodiment, the left and right upper end portions 94U are joined to portions that are peak portions in plan view of the bag, at the left and right corresponding sides that are a twin-chamber structure as described above. In this embodiment, the left and right reaction force supporting tubes 94 are communicated with the inner tube 38 (independently) via the gas exits 38D respectively, but may be structured such that the left and right lower end portions 94L communicate with one another and receive a supply of gas from the common gas exit 38D.

As described below in the explanation of the operation and effects of the present embodiment, the main bag 96 is structured similarly to the main bag 26, except for the point that the main bag 96 is made to have a smaller volume than the main bag 26 of the airbag 20. The other structures of the airbag device 90 for a passenger's seat, including the portions that are not illustrated, are basically the same as the corresponding structures of the airbag device 10 for a passenger's seat.

Accordingly, by the airbag device 90 for a passenger's seat relating to the third embodiment as well, similar effects can be obtained by operation that is basically similar to the airbag device 10 for a passenger's seat relating to the first embodiment. Hereinafter, mainly portions, in the operation of the airbag device 90 for a passenger's seat, that differ from the operation of the airbag device 10 for a passenger's seat are described.

Figure 11:
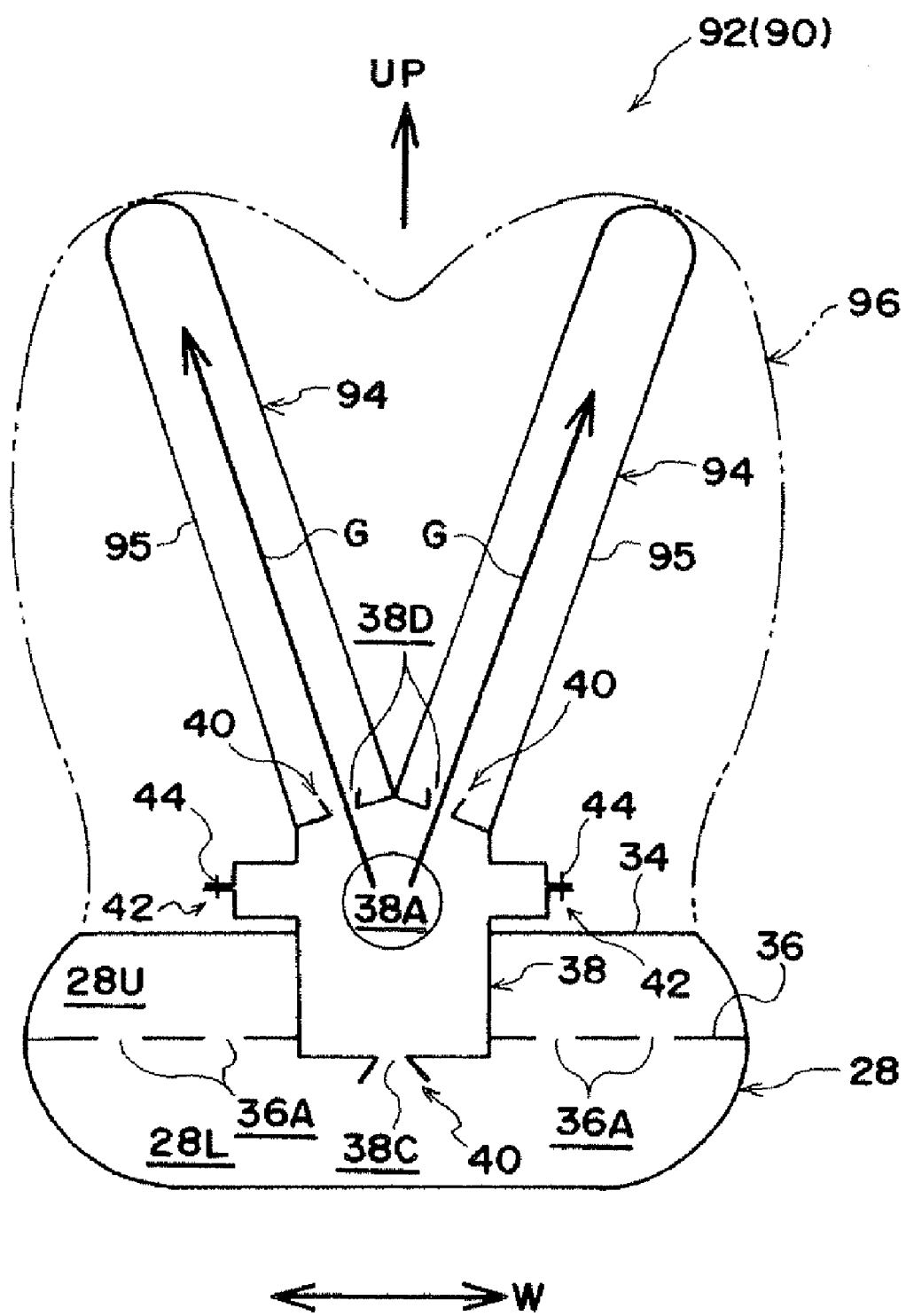
FIG. 11 is a front sectional view schematically showing a gas supplied state to a sub-bag of the airbag that structures the airbag device for a passenger's seat relating to the third embodiment of the present invention.

In the airbag device 90 for a passenger's seat of the above-described structure, when the inflator 22 is operated at the time of a front collision of the vehicle V, the airbag 92 that receives a supply of the gas from the inflator 22 is inflated and expanded at the vehicle cabin C in the same way as the case of the above-described airbag 20. Concretely, the inner tube 38 first is inflated and expanded, and, as shown in FIG. 11, the gas that has passed through the inner tube 38 is supplied from the gas exit 38C to the sub-bag 28, and is supplied from the gas exits 38D to the reaction force supporting tubes 94. Because the sub-bag 28 is inflated and expanded and restrains the knees K in the same way as the case of the above-described airbag 20, description is omitted.

Figure 12:
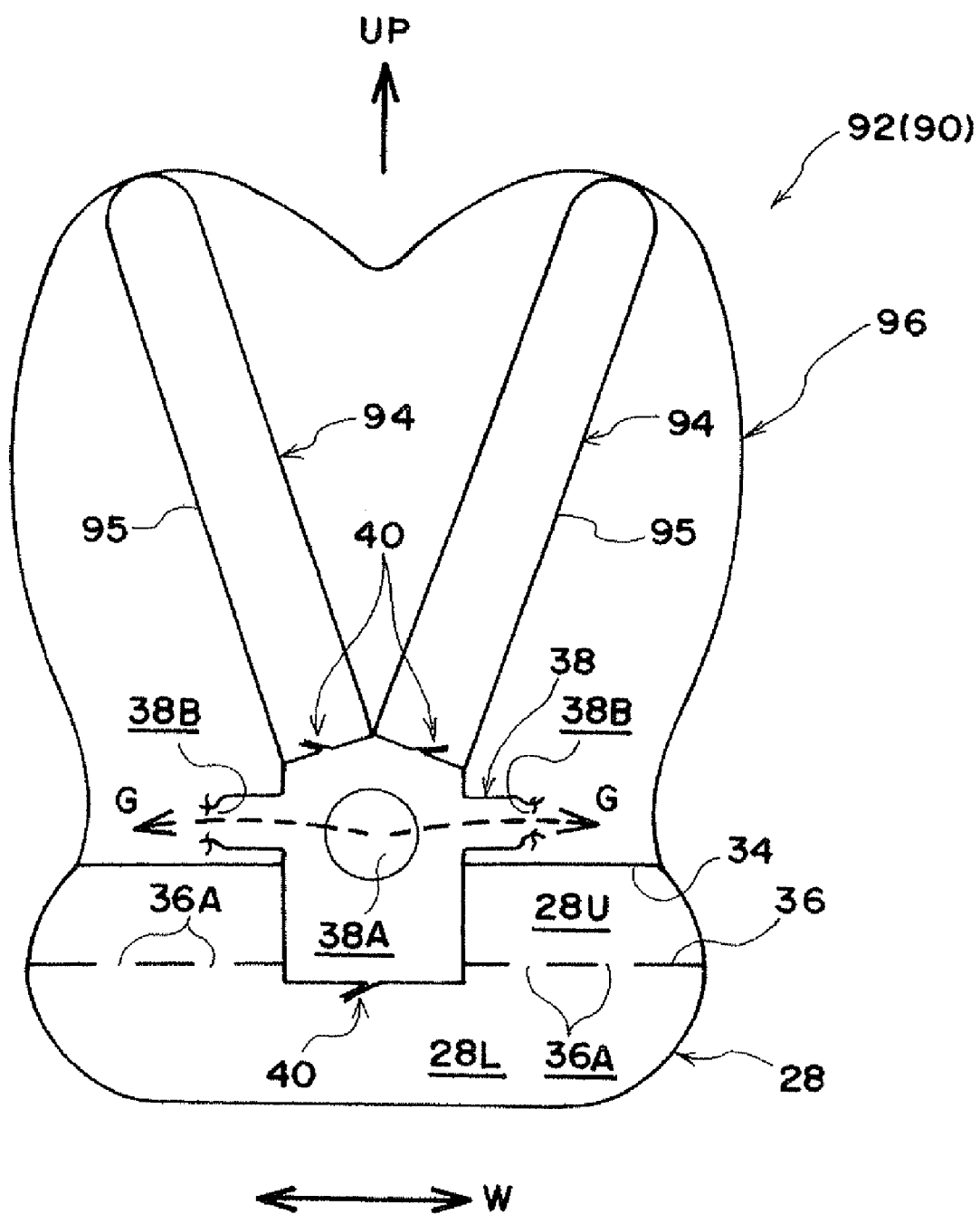
FIG. 12 is a front sectional view schematically showing a gas supplied state to a main bag of the airbag that structures the airbag device for a passenger's seat relating to the third embodiment of the present invention.

The left and right reaction force supporting tubes 94 are inflated and expanded into predetermined shapes (expansion is completed) by the supply of gas that has passed through the gas exits 38D. When the internal pressure of the inner tube 38 exceeds a predetermined value in the process of expansion or after completion of expansion of these reaction force supporting tubes 94, the tear seams 44 are ruptured, and, in the same way as the case of the airbag 20, the main bag 96 is inflated and expanded as shown in FIG. 12. The upper body U of the seated passenger P is restrained by the main bag 96.

Accompanying this restraining, the left and right reaction force supporting tubes 94 are pushed against the windshield glass 14 and the instrument panel 16, and the reaction force that accompanies the restraining is supported. Then, when, for example, the internal pressures of the reaction force supporting tubes 94 become relatively high accompanying the above-described reaction force supporting of the airbag 92 (main bag 96), the gas exits 38D are closed by the check valves 40 (see FIG. 12). Therefore, in the airbag device 90 for a passenger's seat, the internal pressures of the reaction force supporting tubes 94 are maintained, and the reaction force of the airbag 92 can be supported well by the reaction force supporting tubes 94.

Due thereto, in the airbag device 90 for a passenger's seat, the volume of the main bag 96 can be made to be small as compared with the main bag 26 of the airbag 20 that does not have the reaction force supporting tubes 94. This point is supplementarily described hereinafter. At the main bag 26, the reaction force at the time of restraining the upper body U is supported (displacement toward the vehicle front side is limited) by the frictional force with the windshield glass 14, the instrument panel 16. On the other hand, in order to suppress load at the time of restraining the upper body U, the internal pressure (friction resistance) of the main bag 26 is made to be high and the frictional force cannot be ensured. Therefore, the frictional force must be ensured by making the contact surface area of the main bag 26 with the windshield glass 14, the instrument panel 16 to be relatively wide, and it is difficult to greatly decrease the volume.

In contrast, in the airbag 92, because a portion of the reaction force at the time of restraining the upper body U of the passenger P is supported by the reaction force supporting tubes 94, the amount of contribution of the frictional force between the main bag 96 and the windshield glass 14, the instrument panel 16 in this reaction force is reduced. Therefore, the contact surface area of the main bag 96 with the windshield glass 14, the instrument panel 16 can be decreased, and the volume of the main bag 96 can be greatly decreased as compared with the volume of the main bag 26. In this embodiment, the volume of the main bag 96 is decreased as compared with the main bag 26 that is shown by the imaginary line in FIG. 9. The decrease in volume of the main bag 96 contributes also to a decrease in volume of the inflator 22.

Further, in the airbag device 90 for a passenger's seat, because the reaction force supporting tubes 94 bear a portion of the supported reaction force at the time of restraining the upper body U of the passenger P as described above, the internal pressure of the main bag 96 can be reduced and the restraining load of the seated passenger P also can be reduced, instead of a decrease in volume of the main bag 96 or together with a decrease in volume.

Moreover, in the airbag device 90 for a passenger's seat, because the pair of the left and right reaction force supporting tubes 94 are expanded so as to form a substantial "V" shape, the reaction force that accompanies the restraining of the upper body U of the passenger P by the main bag 96 is supported in a form that is near three-point support. Due thereto, the main bag 96 can be supported in a stable posture via the reaction force supporting tubes 94, and the posture of restraining the upper body U of the passenger P by the main bag 96 is stable.

Fourth Embodiment

Figure 13:
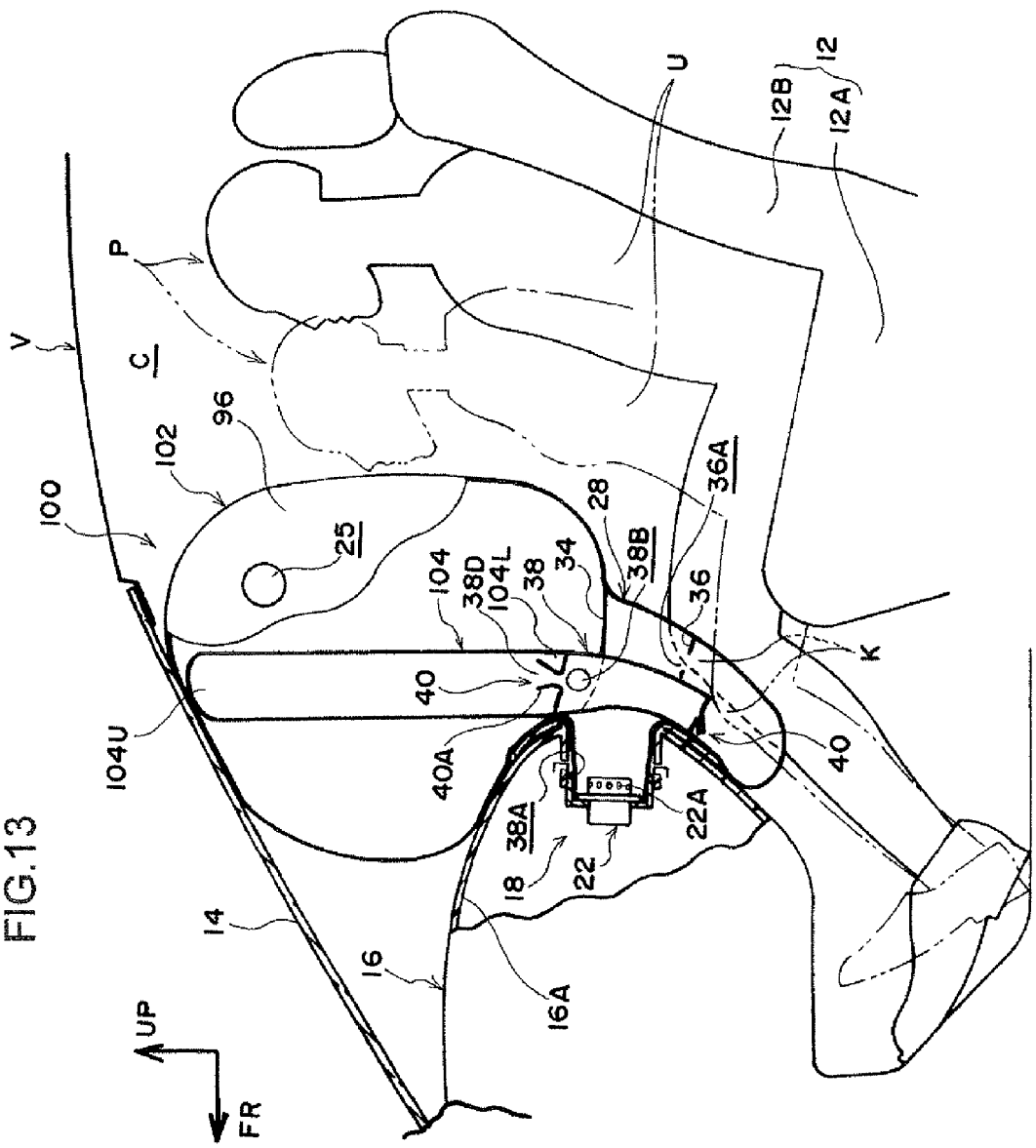
FIG. 13 is a side sectional view schematically showing an airbag expanded state at an airbag device for a passenger's seat relating to a fourth embodiment of the present invention.
Figure 14:
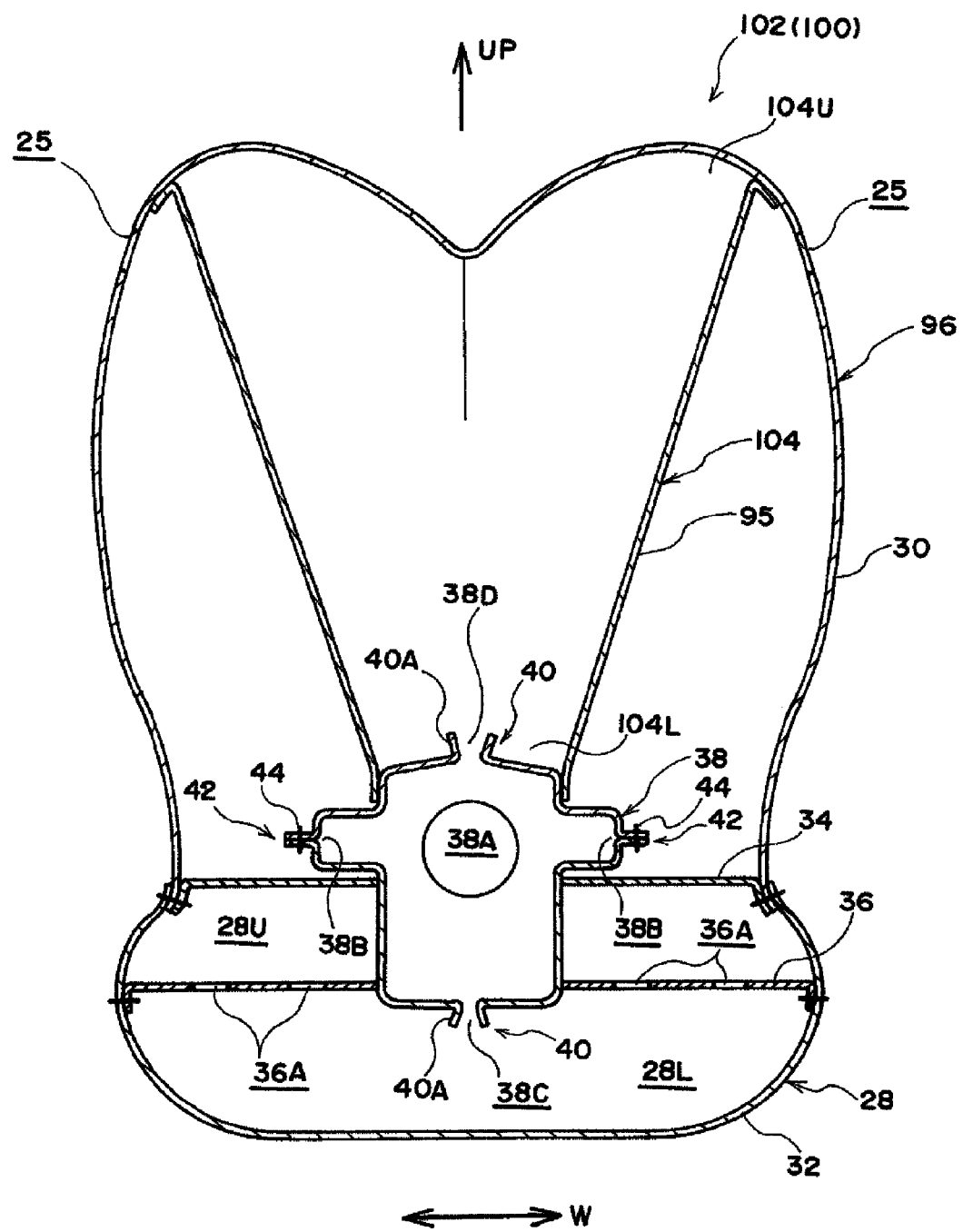
FIG. 14 is a front sectional view of an airbag that structures the airbag device for a passenger's seat relating to the fourth embodiment of the present invention.

The operated state of an airbag device 100 for a passenger's seat relating to a fourth embodiment of the present invention is shown in a schematic side sectional view in FIG. 13. Further, an airbag 102 that structures the airbag device 100 for a passenger's seat is shown in FIG. 14 in a front sectional view corresponding to FIG. 10. As shown in these drawings, the airbag device 100 for a passenger's seat differs from the airbag device 90 for a passenger's seat relating to the third embodiment with regard to the point that the airbag 102 of the airbag device 100 for a passenger's seat has a single reaction force supporting tube 104 instead of the plural reaction force supporting tubes 94.

As shown in FIG. 14, at the reaction force supporting tube 104, a lower end 104L in the vehicle vertical direction is communicated, in a sealed state by sewing or the like, with the upper end of the inner tube 38, and is communicated with the inner tube 38 via the gas exit 38D. On the other hand, an upper end portion 104U in the vehicle vertical direction of the reaction force supporting tube 104 is joined by sewing or the like to a portion that forms the ceiling in the expanded state at the main bag 96.

In FIG. 14, an example in which a base cloth 95 of the ceiling portion is commonly used at the main bag 96 and the reaction force supporting tube 104 is shown, but the reaction force supporting tube 104 may have an independent ceiling in the same way as the reaction force supporting tubes 94. The reaction force supporting tube 104 is folded-up and accommodated in the airbag case 24 together with the other structural portions of the airbag 102 (mainly the main bag 96, the sub-bag 28, the inner tube 38).

Further, the reaction force supporting tube 104 is structured such that, in the inflated and expanded state, as shown in FIG. 13, the lower end portion 104L in the vehicle vertical direction faces the instrument panel 16 at the vehicle rear side, and the upper end portion 104U in the vehicle vertical direction faces the windshield glass 14 at the vehicle rear side. The thickness, in the vehicle longitudinal direction as seen in side view, of the reaction force supporting tube 104 in this expanded state is equal to the reaction force supporting tubes 94, and the reaction force supporting tube 104 is expanded on the whole in a flat shape that is thin toward the front and the rear. The other structures at the airbag device 90 for a passenger's seat, including portions that are not illustrated, are basically the same as the corresponding structures of the airbag device 10 for a passenger's seat.

Accordingly, by the airbag device 100 for a passenger's seat relating to the fourth embodiment as well, similar effects can be obtained by operation that is basically similar to the airbag device 90 for a passenger's seat relating to the third embodiment. Moreover, in the airbag device 100 for a passenger's seat, because the vehicle transverse direction both edges of the reaction force supporting tube 104 are expanded so as to form a substantial "V" shape, the reaction force that accompanies the restraining of the upper body U of the passenger P by the main bag 96 is supported in a form that is near three-point support. Due thereto, the main bag 96 can be supported in a stable posture via the single reaction force supporting tube 104, and the posture of restraining the upper body U restraining of the passenger P by the main bag 96 is stable.

Fifth Embodiment

Figure 15:
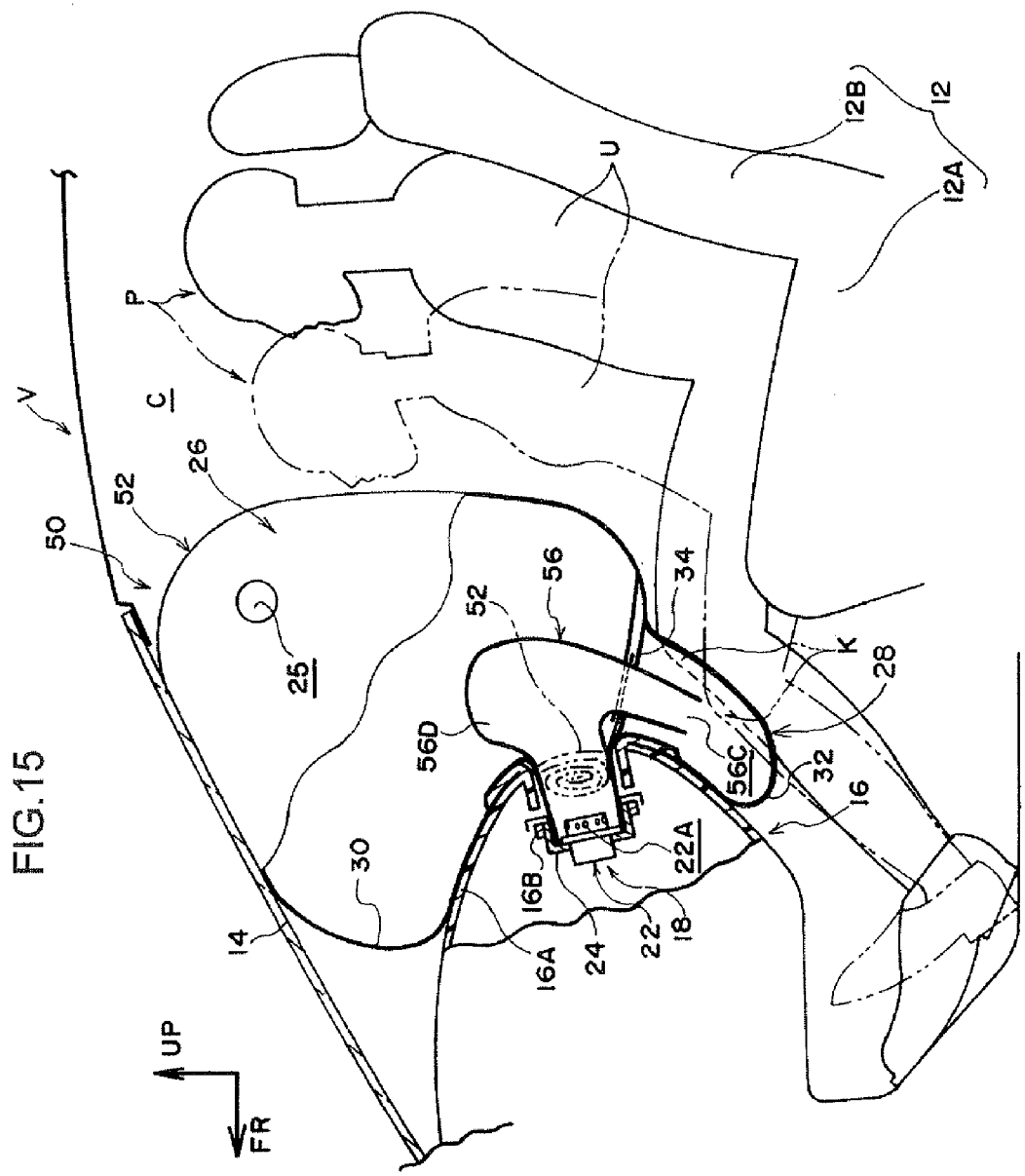
FIG. 15 is a side sectional view schematically showing an airbag expanded state at an airbag device for a passenger's seat relating to a fifth embodiment of the present invention.

The front portion of the vehicle cabin C interior of the vehicle V in an operated state of an airbag device 50 for a passenger's seat is shown in a schematic side sectional view in FIG. 15. Further, the operated state of the airbag device 50 for a passenger's seat relating to the fifth embodiment of the present invention is shown in a schematic side sectional view in FIG. 16, and the expanding process of an airbag 52 that structures the airbag device 50 for a passenger's seat is shown in schematic side sectional views in FIG. 17A through FIG. 17C. As shown in these drawings, the airbag device 50 for a passenger's seat differs from the airbag device 10 for a passenger's seat with regard to the point that the airbag 52 has a tube closing mechanism 54 serving as a gas discharge suppressing structure and a flow path closing structure, instead of the check valve 40. Concrete description is given hereinafter.

As shown in FIG. 15, the passenger's seat 12 that serves as a seat for a vehicle is disposed at the vehicle cabin C interior front portion. The passenger's seat 12 has the seat cushion 12A on which the passenger P sits while facing toward the front of the vehicle, and the seat back 12B that supports, from the vehicle rear side, the passenger P seated on the seat cushion 12A. The passenger's seat 12 is structured such that the posture (position) thereof can be adjusted to postures including a posture at which the passenger P of a large build is seated as shown by the solid lines in FIG. 15, and a posture at which a passenger of a small build is seated as shown by the two-dot chain lines.

The windshield glass 14 that prescribes the vehicle front end of the vehicle cabin C is disposed at the vehicle front side with respect to the passenger's seat 12. Further, the instrument panel 16 is provided at the vehicle lower side with respect to the windshield glass 14. The upper portion 16A in the vehicle vertical direction of the instrument panel 16 projects toward the passenger's seat 12 side, and the passenger P seated in the passenger's seat 12 places his/her legs beneath the upper portion 16A. Accordingly, the vehicle V is structured such that the passenger P seated in the passenger's seat 12 places his/her knees K near the upper portion 16A of the instrument panel 16.

The airbag device 50 for a passenger's seat has the airbag module 18 that is disposed within the instrument panel 16. The airbag module 18 is structured with the airbag 52, the inflator 22 for supplying gas to the airbag 52, and the airbag case 24 that holds (accommodates portions of) the airbag 52 and the inflator 22, being the main portions thereof. At the airbag case 24, the airbag module 18 is held by the mounting portion 16B that is provided at the instrument panel 16.

In this embodiment, as shown in FIG. 15, the airbag 52 has the main bag 26 that serves as a first airbag for protecting the upper body U of the seated passenger P, and the sub-bag (knee airbag) 28 that serves as a second airbag for protecting the knees K. Therefore, in the airbag device 50 for a passenger's seat, the airbag module 18 is provided so as to face toward the rear of the vehicle, in a vicinity of the vehicle rearmost portion at the upper portion 16A of the instrument panel 16.

Concretely, the airbag case 24 is held at the mounting portion 16B in a posture of opening substantially toward the rear in the vehicle longitudinal direction, and holds (accommodates a portion of) the airbag 52 that is in a folded-up state as shown by the two-dot chain line in FIG. 15. The folded-up state is maintained due to the airbag 52 being enveloped by a holding sheet or the like that is not illustrated. The inflator 22 is fixedly held by the airbag case 24 in a state in which a portion of the inflator 22, that includes the gas jetting ports 22A, is inserted within the airbag 52. In this embodiment, the inflator 22 is a so-called disc-type inflator, and a sufficient volume is ensured with respect to the airbag 52 that has the main bag 26 and the sub-bag 28 as described above.

Figure 16:
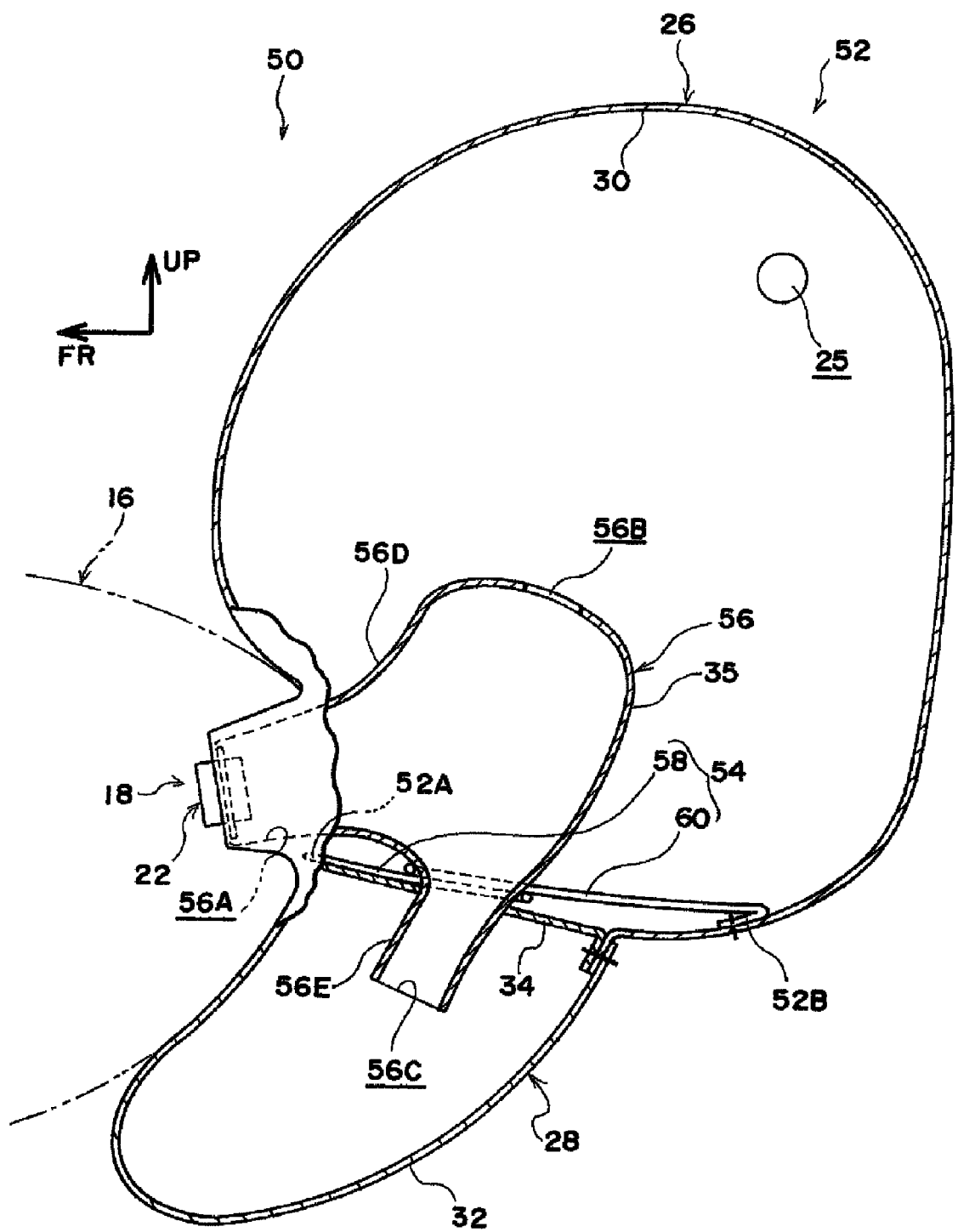
FIG. 16 is a side sectional view showing, in an enlarged manner, the airbag expanded state at the airbag device for a passenger's seat relating to the fifth embodiment of the present invention.
Figure 17A:
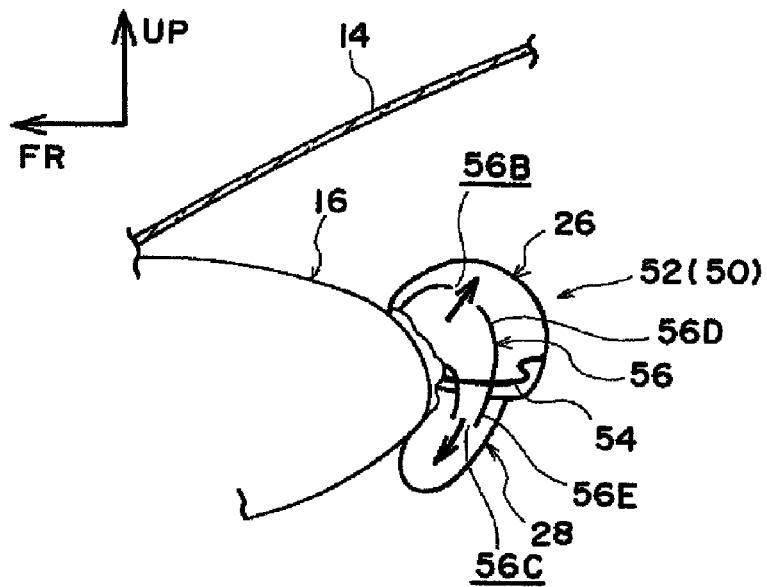
FIG. 17A is a side sectional view schematically showing an initial stage of expansion of an airbag at the airbag device for a passenger's seat relating to the fifth embodiment of the present invention.
Figure 17B:
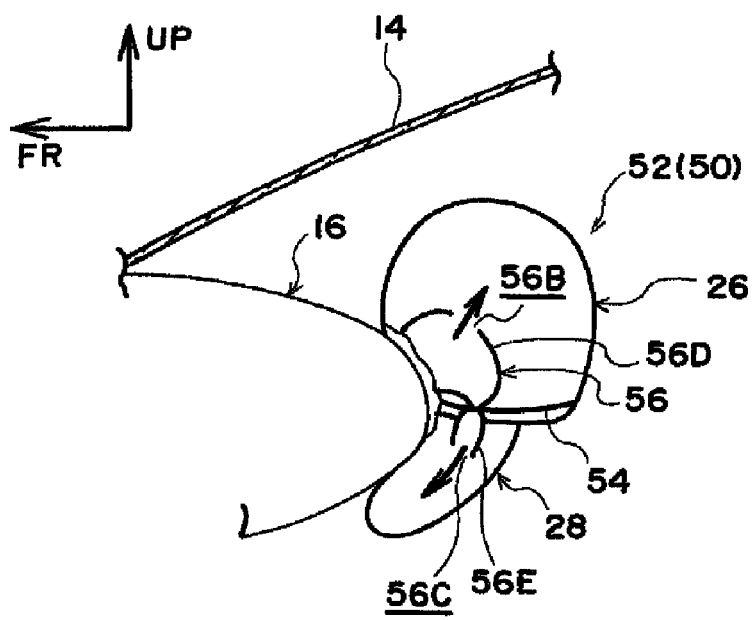
FIG. 17B is a side sectional view schematically showing an intermediate stage of expansion of the airbag at the airbag device for a passenger's seat relating to the fifth embodiment of the present invention.
Figure 17C:
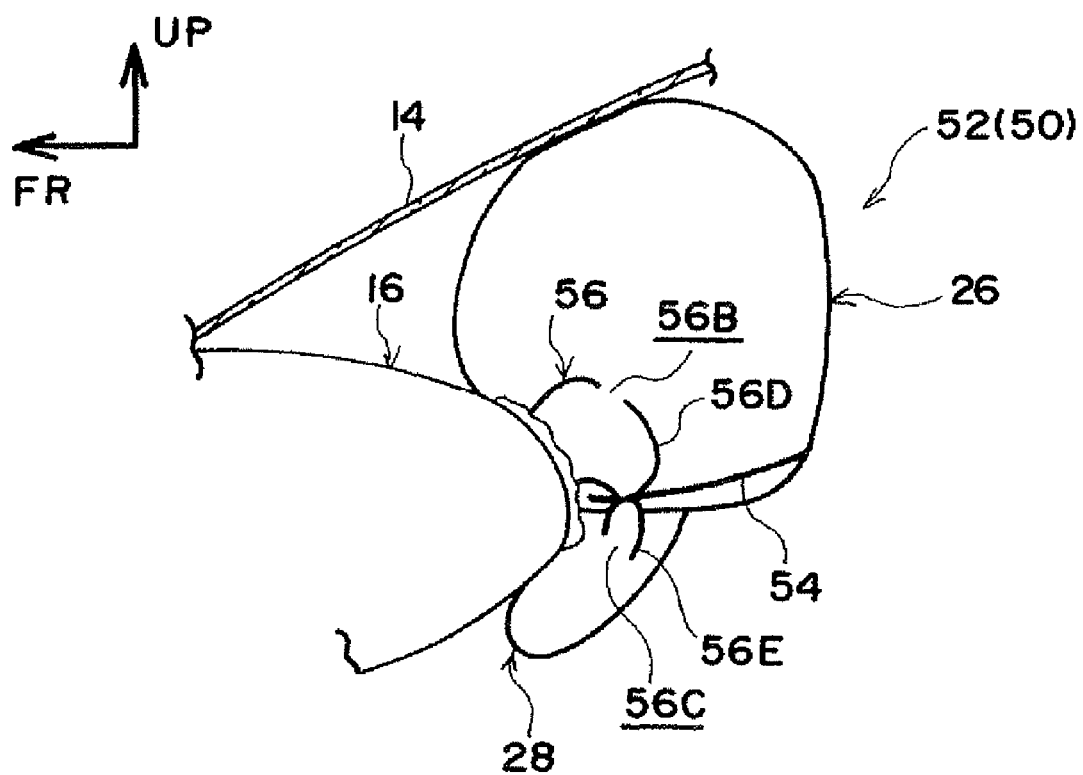
FIG. 17C is a side sectional view schematically showing a final stage of expansion of the airbag at the airbag device for a passenger's seat relating to the fifth embodiment of the present invention.

The main bag 26 of the airbag 52 is inflated and expanded between the upper body U of the seated passenger P, and the windshield glass 14 and the instrument panel 16, and restrains relative movement of the upper body U toward the front of the vehicle. In this embodiment, the vent hole 25 for internal pressure adjustment is formed at the main bag 26. The sub-bag 28 is inflated and expanded between the instrument panel 16 (the upper portion 16A) and the knees K, and restrains relative movement of the knees K toward the front of the vehicle. The main bag 26 and the sub-bag 28 of the airbag 52 are structured integrally as shown in FIG. 16.

Concretely, the main bag 26 is fowled, so as to inflate and expand in the shape of a bag, of the base cloth 30 that structures the vehicle vertical direction upper portion and intermediate portion at the airbag 52. In this embodiment, the main bag 26 is an airbag of a so-called twin chamber structure as if left and right bags that are adjacent in the vehicle transverse direction are connected. The main bag 26 is formed such that the vehicle rear ends of the left and right bags (chambers) respectively restrain the left and right separate shoulder portions (or vicinities thereof) of the seated passenger P.

The sub-bag 28 is formed by the base cloth 32 and in the shape of a bag that opens toward the top of the vehicle, and the opening edge is joined by sewing or the like to the vehicle lower side opening edge of the main bag 26. Due thereto, the airbag 52 is formed on the whole in the shape of a large bag. The base cloth 32 differs from the base cloth 30 with respect to the point that the surface of the base cloth 32 is subjected to a weave sealing processing such as silicon coating or the like, and gas leaks from the main bag 26 interior through the weave of the base cloth 32 are prevented (suppressed as compared with the base cloth 30). From the standpoint of preventing gas leaks, it is preferable to carry out silicon coating for maintaining the internal pressure of the sub-bag 28 on the inner surface of the sub-bag 28.

The airbag 52, that is expanded in the shape of a large bag on the whole as described above, has the tether 34 serving as a cloth-like material for demarcating (separating) the interior of the airbag 52 into the chamber of the main bag 26 and the chamber of the sub-bag 28. The tether 34 forms a strip shape, and, as shown in FIG. 16 as well, limits the inflation in the vehicle longitudinal direction of the sub-bag 28. In this embodiment, the tether 34 is joined by sewing or the like to the sewn portion of the base cloth 30 and the base cloth 32.

Note that an unillustrated tether (a member corresponding to the tether 36 of the first embodiment) that serves as a partitioning cloth may be provided at the portion that becomes the substantially intermediate portion in the vehicle vertical direction in the expanded state at the sub-bag 28 interior. Such a tether forms two chambers that are demarcated in the vehicle vertical direction within the chamber of the sub-bag 28, and limits the inflation in the vehicle longitudinal direction of the sub-bag 28. In a case of providing this tether 36, communication holes, that serve as plural communication paths for communicating the upper and lower chambers, may be formed.

Further, the airbag device 50 for a passenger's seat relating to the fifth embodiment has an inner tube 56 instead of the inner tube 38. The inner tube 56 is formed by the base cloth 30 and in the shape of a tube or the shape of a bag that receives a supply of gas and is inflated and expanded. The inner tube 56 has a gas entrance 56A into which gas of the inflator 22 is supplied, one or plural main-side gas exits 56B that open to the main bag 26 interior, and a sub-side gas exit 38C that opens to the sub-bag 28 interior. The gas exit 56C is formed at the distal end of a tube portion 56E that extends in a tube shape from a bag-shaped main body 56D of the inner tube 56. In this embodiment, the tube portion 56E passes through the tether 34.

Figure 18:
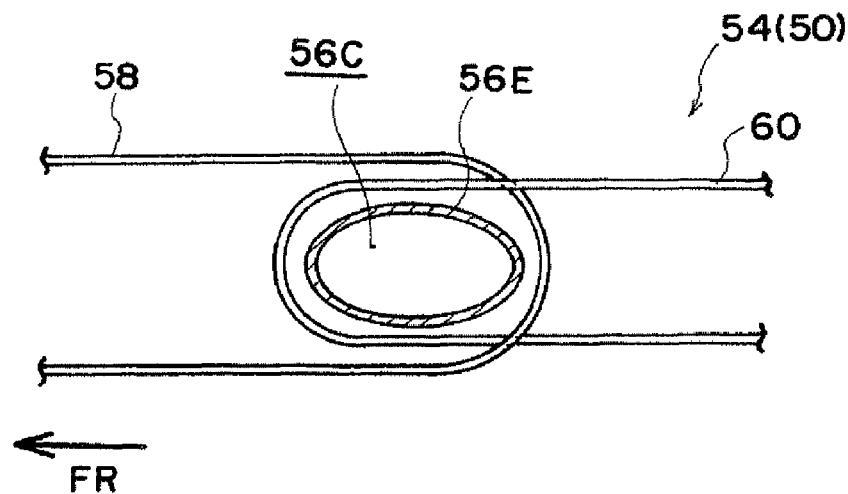
FIG. 18 is a plan view schematically showing a tube closing mechanism that structures the airbag device for a passenger's seat relating to the fifth embodiment of the present invention.

The tube closing mechanism 54 relating to this embodiment has cords 58, 60 that serve as a pair of cord-like members that are wound around the tube portion 56E of the inner tube 56. Both ends of the cord 58 are respectively joined by sewing or the like to a portion of (the vicinity of) the mounting portion to the airbag case 24 at the airbag 52 (hereinafter called front side joining portion 52A), and, as shown in FIG. 18, the cord 58 is wound on the inner tube 56 such that the intermediate portion is trained, from the vehicle rear side, around the tube portion 56E that is expanded. On the other hand, both ends of the cord 60 are respectively joined by sewing or the like to a portion that expands at the main bag 26 and is positioned at the vehicle rear side of the inner tube 56 (hereinafter called rear side joining portion 52B), and, as shown in FIG. 18, the cord 60 is wound on the inner tube 56 such that the intermediate portion is trained, from the vehicle front side, around the tube portion 56E that is expanded.

Accordingly, at the tube closing mechanism 54, the one pair (group) of the two cords 58, 60 can be interpreted as being members that are wound around the tube portion 56E. This tube closing mechanism 54 is a structure in which, when the main bag 26 is inflated and expanded, the tube portion 56E is bound (throttled) and closed by the cord 58 and the cord 60 to which tensile forces are applied in opposite directions toward the front and the rear relatively. In this embodiment, the joined region of both ends of the cord 60 at the main bag 26 is set such that the tube portion 56E is closed before expansion of the main bag 26 is completed. Concretely, the both ends of the cord 60 are joined to a portion that is expanded and forms a vicinity of the vehicle lower rear end of the main bag 26.

As shown in FIG. 15, the airbag doors 46, that are ruptured and open due to the inflation and expansion pressure of the airbag 52, are formed at the portion where the airbag module 18 is mounted at the instrument panel 16. Due to the instrument panel 16 tearing-open groove-shaped tear lines formed at the inner surface side thereof, the airbag doors 46 relating to this embodiment are expanded upward and downward with hinge portions as axes, and form an opening in the instrument panel 16. The inflation and expansion of the airbag 52 toward the instrument panel 16 exterior, i.e., toward the vehicle cabin C, are permitted through this opening.

In the above-described airbag device 50 for a passenger's seat, when a front collision of the vehicle V is detected or a front collision being unavoidable is predicted on the basis of output of an unillustrated collision sensor for example, an unillustrated airbag ECU serving as a control device causes the inflator 22 to operate.

Operation of the fifth embodiment is described next.

In the airbag device 50 for a passenger's seat of the above-described structure, when a front collision of the vehicle V is detected or predicted on the basis of a signal from the collision sensor, the airbag ECU causes the inflator 22 to operate (ignite). Then, the airbag 52 that receives the gas supply from the inflator 22 is inflated within the instrument panel 16, and due to the expansion pressure thereof, expands the airbag doors 46 and passes through the formed opening and inflates and expands at the vehicle cabin C.

At this time, the inner tube 56, to which gas of the inflator 22 is supplied from the gas entrance 56A, is first inflated and expanded, and, via this inner tube 56, gas is supplied from the gas exit 56C to the sub-bag 28 and gas is supplied from the gas exit 56B to the main bag 26. Then, at the airbag device 50 for a passenger's seat, due to gas being supplied from the gas exit 56C to the sub-bag 28, expansion of the sub-bag 28 is completed in a short time from the detection of a front collision.

Further, in the airbag device 50 for a passenger's seat, due to gas being supplied from the gas exit 56B of the inner tube 56 to the main bag 26, the main bag 26 is inflated and expanded. Expansion of the main bag 26 is completed after expansion of the sub-bag 28, that has a relatively small volume, is completed.

Here, in the airbag device 50 for a passenger's seat, the inner tube 56 is provided at the airbag 52 that has the main bag 26 and the sub-bag 28. Therefore, in the airbag device 50 for a passenger's seat, the gas from the inflator 22 is directly (independently) supplied to the main bag 26 and the sub-bag 28, respectively. Further, in the airbag device 50 for a passenger's seat, due to the tube portion 56E of the inner tube 56 passing through the tether 34 that forms the partitioning wall of the main bag 26 and the sub-bag 28, the gas exit 56C of the inner tube 56 is opened within the sub-bag 28. For these reasons, in the airbag device 50 for a passenger's seat, the sub-bag 28 that has a relatively small volume is inflated and expanded in a short time from the operation of the inflator 22.

Namely, in the airbag device 50 for a passenger's seat, the sub-bag 28 can be inflated and expanded in a short time from the detection of a front collision, at the vehicle front side of the knees K of the seated passenger P at which the space (stroke) in the vehicle longitudinal direction is small. Due to the sub-bag 28, the knees K are restrained, and the load applied to the knees K from the instrument panel 16 side is lessened. Namely, the knees K of the seated passenger P are protected.

In particular, in the airbag device 50 for a passenger's seat, because the tube closing mechanism 54 is provided at the tube portion 56E that communicates the main body 56D with the gas exit 56C at the inner tube 56, the tube portion 56E is throttled and closed by the cord 58 and the cord 60 of the tube closing mechanism 54 accompanying the expansion of the main bag 26. Namely, accompanying the inflation and expansion of the main bag 26, the tube portion 56E of the inner tube 56 is throttled and closed by the cord 58 and the cord 60 that are displaced in opposite directions in the vehicle longitudinal direction relatively. Therefore, discharge of gas from the sub-bag 28 via the inner tube 56 thereafter is prevented or markedly suppressed. Due thereto, a drop in internal pressure of the sub-bag 28 (discharging of gas) that accompanies the restraining of the knees K by the sub-bag 28 is suppressed, and the knees K of the passenger P are protected well.

Namely, in the airbag device 50 for a passenger's seat, discharging of gas from the sub-bag 28, i.e., a drop in internal pressure of the sub-bag 28 (discharging of gas) that accompanies the restraining of the knees K, is suppressed, and the knees K of the seated passenger P are protected even better.

On the other hand, the upper body U of the passenger P is restrained by the main bag 26 that is inflated and expanded, and impact absorption is achieved. For these reasons, the passenger P is protected well by the airbag device 50 for a passenger's seat.

Further, in the airbag device 50 for a passenger's seat, due to the inner tube 56, that is folded-up together with the main bag 26 and the sub-bag 28, being inflated and expanded, the gas from the inflator is supplied directly to the main bag 26 and the sub-bag 28, respectively, from the inner tube 56. Namely, by a simple airbag structure and without relying on an external structure of the airbag 52, gas can be supplied directly (independently) to the main bag 26 and the sub-bag 28 respectively, which contributes to good protection of the upper body U and the knees K of the seated passenger P as described above.

In this way, in the present airbag device 50 for a passenger's seat, the upper body and the knees of the passenger can be protected effectively by a simple airbag structure.

Further, in the airbag device 50 for a passenger's seat, the total volume of the main bag 26 and the sub-bag 28 is constant without depending on the supply path of the gas. Therefore, although the airbag device 50 for a passenger's seat is a structure that inflates and expands the sub-bag 28 in a short time as described above, the time until completion of expansion of the main bag 26 does not become long. Further, in the airbag device 50 for a passenger's seat, because the inner tube 56 is a structure that is inflated and expanded at the interiors of the main bag 26 and the sub-bag 28, the inner tube 56 bears a portion of the volume of the main bag 26 and the sub-bag 28. Therefore, the airbag 52 that includes the main bag 26 and the sub-bag 28 can be expanded on the whole in a short time (by a small amount of gas).

As described above, in accordance with the airbag device 50 for a passenger's seat relating to the fifth embodiment as well, similar effects can be obtained by operation that is basically similar to the airbag device 10 for a passenger's seat relating to the first embodiment, except for the internal pressure maintaining operation of the sub-bag 28 by the tube closing mechanism 54 and the operation and effects due to the main bag expansion delaying structure 42. Hereinafter, the internal pressure maintaining operation of the sub-bag 28 by the tube closing mechanism 54 of the airbag device 50 for a passenger's seat is supplementarily described.

Note that the fifth embodiment illustrates an example in which the main bag expansion delaying structure 42 is not provided at the gas exit 56B, but the present invention is not limited to this, and, in the same way as in the airbag device 10 for a passenger's seat, the main bag expansion delaying structure 42 (the tear seam 44) may be provided with respect to the one or plural gas exits 56B for example. In other words, there may be a structure in which the inner tube 38 is provided instead of the inner tube 56 in the fifth embodiment, and the tube closing mechanism 54 is provided at the sub-bag 28 side with respect to the forked portion of the main bag 26 side and the sub-bag 28 side at this inner tube 38. In this structure, the check valve 40 does not have to be provided at the gas exit 38C.

Figure 19:
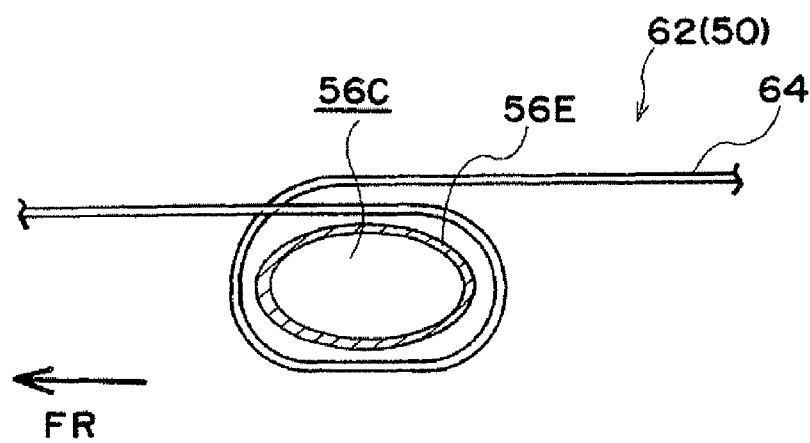
FIG. 19 is a plan view schematically showing a first modified example of the tube closing mechanism that structures the airbag device for a passenger's seat relating to the fifth embodiment of the present invention.
Figure 20:
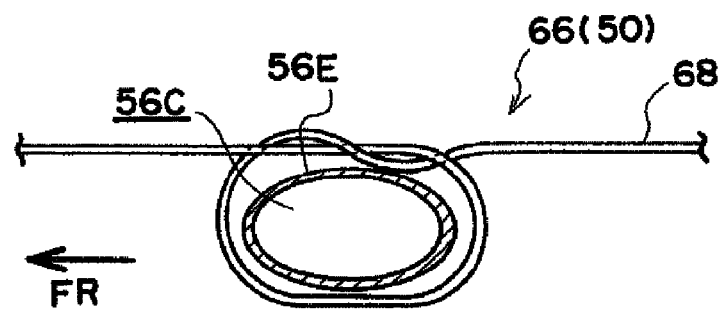
FIG. 20 is a plan view schematically showing a second modified example of the tube closing mechanism that structures the airbag device for a passenger's seat relating to the fifth embodiment of the present invention.
Figure 21:
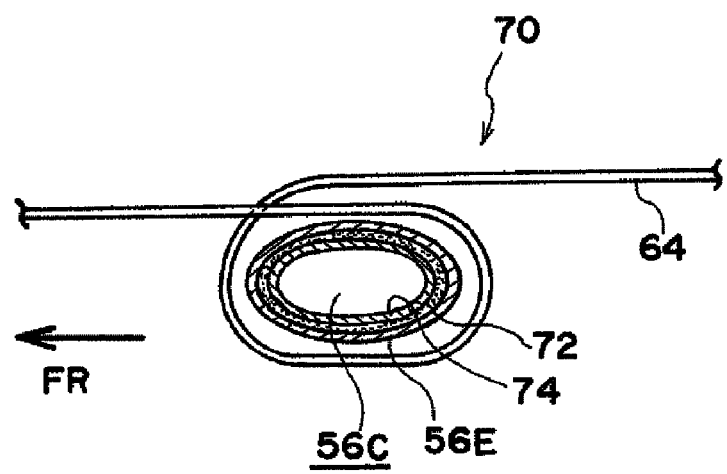
FIG. 21 is a plan view schematically showing a third modified example of the tube closing mechanism that structures the airbag device for a passenger's seat relating to the fifth embodiment of the present invention.

Further, the fifth embodiment illustrates an example in which the airbag device 50 for a passenger's seat is structured to include the tube closing structure 54 that is formed by the pair of cords 58, 60, but the present invention is not limited to this, and structures relating to modified examples may be operated as shown in FIG. 19 through FIG. 21 for example.

A tube closing mechanism 62, that serves as a gas discharge suppressing structure and a flow path closing structure relating to a first modified example shown in FIG. 19, has a single cord 64 whose one end is joined to the front side joining portion 52A at the airbag 52 and whose other end is joined to the rear side joining portion 52B. The intermediate portion of the cord 64 is wound at least one time around the tube portion 56E. Due thereto, the tube closing mechanism 62 is a structure in which, accompanying the expansion of the main bag 26, the tube portion 56E is throttled and closed by the cord 64.

A tube closing mechanism 66, that serves as a gas discharge suppressing structure and a flow path closing structure relating to a second modified example shown in FIG. 20, has a single cord 68 whose one end is joined to the front side joining portion 52A at the airbag 52 and whose other end is joined to the rear side joining portion 52B. The intermediate portion of the cord 68 is wound at least one time around the tube portion 56E, and is passed through the annular portion formed by this winding-around. Due thereto, the tube closing mechanism 66 is a structure in which, accompanying the expansion of the main bag 26, the tube portion 56E is throttled and closed by the single cord 68, and a knot of the cord 68 is formed at this closed portion. Therefore, in the airbag device 50 for a passenger's seat that is equipped with the tube closing mechanism 66 relating to the present modified example, the closed state of the tube portion 56E by the cord 68 is easily maintained.

A tube closing mechanism 70, that serves as a gas discharge suppressing structure and a flow path closing structure relating to a third modified example shown in FIG. 21, has, in addition to the single cord 64, a self-adhesive (adhesive) 72 that is coated on the inner peripheral surface of the tube portion 56E. A release paper 74 is adhered to the self-adhesive 72, and the tube portion 56E is structured so as to not be closed by the self-adhesive 72 in the folded-up state and in the initial stage of operation of the inflator 22. The release paper 74 is formed of a material that melts due to the heat of the gas from the inflator 22. Due thereto, when the gas from the inflator 22 is supplied to the inner tube 56, due to this gas pressure, the tube portion 56E (gas exit 56C) is opened, and the release paper 74 is melted and eliminated. There is a structure in which, then, when the cord 64 throttles and closes the tube portion 56E accompanying the inflation and expansion of the main bag 26, the inner peripheral surface of the tube portion 56E is self-adhered via the self-adhesive 72, and the closed state of the tube portion 56E is maintained.

Note that, in the above-described third modified example, the single cord 68 may be used or the pair of cords 58, 60 may be used instead of the single cord 64.

Sixth Embodiment

The operated state of an airbag device 80 for a passenger's seat relating to a sixth embodiment of the present invention is shown in a schematic side sectional view in FIG. 22. As shown in this drawing, the airbag device 80 for a passenger's seat differs from the airbag device 50 for a passenger's seat relating to the fifth embodiment with regard to the point that an airbag 82 of the airbag device 80 for a passenger's seat has a tube closing mechanism 84 that closes the tube portion 56E accompanying the inflation and expansion of the sub-bag 28, instead of the tube closing mechanism 54 (62, 66, 70) that closes the tube portion 56E accompanying the inflation and expansion of the main bag 26.

Namely, both ends of the cord 60 that structures the tube closing mechanism 84 are joined by sewing or the like to a portion at the sub-bag 28 that expands and that is positioned further toward the rear of the vehicle than the inner tube 56 (hereinafter called rear side joined portion 82B). Note that both ends of the cord 58 are respectively joined by sewing or the like to a front side joining portion 82A that is a portion (in a vicinity) of a mounting portion to the airbag case 24 at the airbag 82. Due thereto, in the airbag device 80 for a passenger's seat, the sub-bag 28 is a structure in which, accompanying its own inflation and expansion, the tube portion 56E is closed by the tube closing mechanism 84. The other structures at the airbag device 80 for a passenger's seat, including portions that are not illustrated, are the same as the corresponding structures of the airbag device 50 for a passenger's seat (the airbag device 10 for a passenger's seat).

Accordingly, by the airbag device 80 for a passenger's seat relating to the sixth embodiment as well, similar effects can be obtained by operation that is basically similar to the airbag device 50 for a passenger's seat, except for the point that the tube portion 56E is closed accompanying the inflation and expansion of the sub-bag 28. Further, in the airbag device 80 for a passenger's seat, because the tube portion 56E is closed accompanying the inflation and expansion of the sub-bag 28, the tube portion 56E is closed independently of the inflation and expansion of the main bag 26, and the internal pressure maintaining effect of the sub-bag 28 can be exhibited. Further, the internal pressure maintaining effect of the sub-bag 28 can be exhibited in an even shorter time from the start of operation of the inflator 22. For these reasons, even in a structure in which the space at the vehicle front side of the knees K is small, the knees K can be restrained (protected) well while the internal pressure of the sub-bag 28 is maintained.

Note that, in the airbag device 80 for a passenger's seat relating to the sixth embodiment as well, the tube closing mechanism 62, 66, 70 relating to the modified examples shown in FIG. 19 through FIG. 21 can be employed. In particular, in the airbag device 80 for a passenger's seat, the possibility of the closed state of the tube portion 56E becoming loose as the sub-bag 28 that restrains the knees K becomes thinner in the vehicle longitudinal direction is considered. As a countermeasure thereto, a structure in which the closed state of the tube portion 56E is maintained, i.e., the tube closing mechanism 66, 70, can be employed.

Note that the above third and fourth embodiments illustrate examples in which a drop in internal pressure of the reaction force supporting tubes 94, 104 is suppressed by the gas exits 38D being closed by the check valves 40, but the present invention is not limited to this. Accordingly, for example, a structure in which a drop in internal pressure of the reaction force supporting tubes 94, 104 is suppressed by the tube closing mechanism 54 (62, 66, 70) may be employed.

Further, the above first through fourth embodiments illustrate examples in which the main bag expansion delaying structures 42, 118 (the tear seams 44, 122) are provided at the gas exits 38B of the inner tube 38, but the present invention is not limited to this. Accordingly, for example, in the same way as in the fifth embodiment, there may be a structure that is not provided with the main bag expansion delaying structures 42, or, as another example, the main bag expansion delaying structures 42 may be structured by a means such as sewing cross-shaped notches at the tear seams or the like, or, as yet another example, the main bag expansion delaying structures 42 may be structured by a means other than the tear seams 44, 122 such as an adhesive that is melted by the heat of gas or the like. It goes without saying that the main bag expansion delaying structures 42, 118 may be applied to the fifth and sixth embodiments.

Moreover, the above embodiments illustrate examples in which the main bag 26, 96 that is formed by the base cloth 30 and the sub-bag 28 that is formed by the base cloth 32 are joined by sewing or the like, but the present invention is not limited to this. Accordingly, for example, the main bag 26 (96) and the sub-bag 28 can be made to be structures that are formed by a common base cloth. In this case, it is desirable to carry out a processing for sealing the weave, such as silicon coating or the like, on the portions that structure the sub-bag 28.

Still further, the above embodiments illustrate examples in which the inner tube 38, 56, 116 is inflated and expanded within the main bag 26 (96), the sub-bag 28, but the present invention is not limited to this. Accordingly, for example, there may be a structure in which at least a portion of the inner tube 38, 56, 116 is inflated and expanded at the outer side of the main bag 26 (96), the sub-bag 28.

Further, the above respective embodiments illustrate examples in which the inner tube 38, 56, 116 is formed of the base cloth 35 that is independent from the base cloths 30, 32, but the present invention is not limited to this. Accordingly, for example, there may be a structure in which a portion of the inner tube 38, 56, 116 commonly uses, together with the main bag 26 (96), the sub-bag 28, a portion of the base cloth 30, the base cloth 32.

Moreover, the above respective embodiments illustrate examples in which the main bag 26, 96 is an airbag of a so-called twin-chamber structure as if connecting left and right bags, but the present invention is not limited to this. Accordingly, for example, there may be a structure in which the main bag 26, 96 is an airbag of a so-called single-chamber structure having a single chamber.

Still further, the above respective embodiments illustrate examples in which the airbag device relating to the present invention is applied to the airbag device 10 for a passenger's seat, but the present invention is not limited to this. Accordingly, for example, the airbag device relating to the present invention can be applied to a seat in the vehicle transverse direction center among seats in which three passengers can sit in the vehicle transverse direction, or the like. Further, such a central seat can be interpreted as being included as a passenger's seat in the present invention.

The invention claimed is:

1. An airbag device comprising:
   a first airbag that, by receiving a gas supply and inflating and expanding from a folded-up state, restrains an upper body of a vehicle passenger from a front side in a vehicle longitudinal direction;
   a second airbag that has a smaller volume than the first airbag and that, by receiving a gas supply and inflating and expanding from a folded-up state, restrains knees of the passenger from the front side in the vehicle longitudinal direction;
   a gas flow path member that is flexible, that is folded-up together with the first airbag and the second airbag, and that, by a gas supply from an inflator, is inflated and expanded at interiors of the first airbag and the second airbag and directly leads gas from the inflator to the first airbag and the second airbag respectively;
   a gas discharge suppressing structure that suppresses discharging, from the second airbag, of gas supplied to the second airbag; and
   a material that demarcates an internal space of the first airbag and an internal space of the second airbag, and limits an expanded thickness of the second airbag in the vehicle longitudinal direction,
   the gas flow path member passing through the material and the gas flow path member being opened at the second airbag interior.

2. The airbag device of claim 1, wherein the gas discharge suppressing structure includes a check valve that is provided at the gas flow path member or a communicating portion of the gas flow path member and the second airbag, and that prevents gas flow from the second airbag to the gas flow path member when internal pressure of the second airbag becomes higher than internal pressure of the gas flow path member.

3. The airbag device of claim 1, wherein the gas discharge suppressing structure includes a flow path closing structure that is provided at the gas flow path member or a communicating portion of the gas flow path member and the second airbag, and that, accompanying inflation and expansion of at least one of the first airbag and the second airbag, closes a flow path that communicates the gas flow path member with the second airbag.

4. The airbag device of claim 3, wherein the flow path closing structure is structured such that a member or a pair of members, that is connected to a mounting portion to a vehicle body at a front side in the vehicle longitudinal direction at the first airbag or the second airbag and to a portion that is expanded toward a rear side in the vehicle longitudinal direction with respect to the mounting portion at the first airbag or the second airbag, are wound around a portion that leads gas to the second airbag at the gas flow path member.

5. The airbag device of claim 1, further comprising a communication delaying structure that is provided at the gas flow path member or a communicating portion of the gas flow path member and the first airbag, and that, when internal pressure of the gas flow path member exceeds a predetermined value, changes a state between the inflator and the first airbag to a communicating state from a non-communicating state.

6. The airbag device of claim 1, wherein the gas flow path member is inflated and expanded along a vehicle vertical direction, and is communicated with the first airbag at an upper end side in the vehicle vertical direction, and is communicated with the second airbag at a lower end side in the vehicle vertical direction.

7. The airbag device of claim 1, wherein the gas flow path member extends toward a rear side in the vehicle longitudinal direction and toward an upper side in a vehicle vertical direction, and is expanded so as to be folded-back toward the front side in the vehicle longitudinal direction and a lower side in the vehicle vertical direction, and is communicated with the first airbag at a folded-back portion, and is communicated with the second airbag at a folded-back end side.

8. The airbag device of claim 1, wherein
   the second airbag interior is demarcated by a partitioning cloth into two chambers in the vehicle vertical direction, and
   a plurality of communication paths that communicate the two chambers are formed at the partitioning cloth.

9. The airbag device of claim 8, wherein the gas flow path member passes through the material and the partitioning cloth respectively, and is opened within a chamber at a lower side in the vehicle vertical direction at the second airbag interior.

10. The airbag device of claim 8, wherein the gas flow path member passes through the material, and is opened within a chamber at an upper side in the vehicle vertical direction at the second airbag interior.

11. The airbag device of claim 1, wherein at least a portion, that leads gas to the first airbag at the gas flow path member, is structured so as to supply gas toward both sides in a vehicle transverse direction at the first airbag interior.

12. The airbag device of claim 1, wherein
   the first airbag, the second airbag and the gas flow path member are disposed in a folded-up state within an instrument panel of a vehicle, and
   the airbag device further comprises:
   an in-bag expanding portion that is communicated with the gas flow path member, and that is inflated and expanded by a gas supply from the gas flow path member such that an upper end side in the vehicle vertical direction faces a windshield glass from a rear side in the vehicle longitudinal direction and a lower end side in the vehicle vertical direction faces the instrument panel from a rear side in the vehicle longitudinal direction; and
   a gas discharge suppressing structure for the in-bag expanding portion that suppresses discharging, from the in-bag expanding portion, of gas supplied to the in-bag expanding portion,
   wherein reaction force at a time of restraining the upper body of the passenger by the first airbag is supported by the windshield glass and the instrument panel via the in-bag expanding portion.

13. The airbag device of claim 12, wherein the in-bag expanding portion is shaped such that an interval between both edges in a vehicle transverse direction gradually widens from a lower side toward an upper side in the vehicle vertical direction.

* * * * *